(12) United States Patent
Girotto et al.

(10) Patent No.: US 10,416,377 B2
(45) Date of Patent: Sep. 17, 2019

(54) LUMINAIRE WITH CONTROLLABLE LIGHT EMISSION

(71) Applicant: Cree, Inc., Durham, NC (US)

(72) Inventors: Claudio Girotto, Santa Barbara, CA (US); Eric Tarsa, Goleta, CA (US); Nathan Ray Snell, Raleigh, NC (US); James Ibbetson, Santa Barbara, CA (US); Mark Youmans, Goleta, CA (US); Theodore D. Lowes, Lompoc, CA (US); Bernd Keller, Santa Barbara, CA (US); Ethan Creasman, Raleigh, NC (US); Randall Levy Bernard, Cary, NC (US); William L. Dungan, Cary, NC (US)

(73) Assignee: Cree, Inc., Durham, NC (US)

( * ) Notice: Subject to any disclaimer, the term of this patent is extended or adjusted under 35 U.S.C. 154(b) by 3 days.

(21) Appl. No.: 15/450,578

(22) Filed: Mar. 6, 2017

(65) Prior Publication Data

US 2017/0322364 A1   Nov. 9, 2017

Related U.S. Application Data

(60) Provisional application No. 62/333,000, filed on May 6, 2016.

(51) Int. Cl.
*F21V 8/00* (2006.01)
*F21V 23/04* (2006.01)
(Continued)

(52) U.S. Cl.
CPC .......... *G02B 6/12004* (2013.01); *F21S 6/005* (2013.01); *F21V 23/0435* (2013.01);
(Continued)

(58) Field of Classification Search
CPC .................. G02B 6/12004; G02B 6/0045; 02B 6/0063; G02B 6/0068; G02B 6/0073;
(Continued)

(56) References Cited

U.S. PATENT DOCUMENTS 615,108 A    11/1898  De Segundo
766,515 A     8/1904  Northrup et al.
(Continued)

FOREIGN PATENT DOCUMENTS

DE    10047101 A1    5/2002
DE    10203106 A1    7/2003
(Continued)

OTHER PUBLICATIONS

Ebner/Block et al, Apr. 2018.*
(Continued)

*Primary Examiner* — Alan B Cariaso
(74) *Attorney, Agent, or Firm* — Myers Bigel, P.A.

(57) ABSTRACT

A luminaire includes a first waveguide having a first primary light emitting surface directed in a first direction and a first secondary light emitting surface directed in a second direction. A second waveguide having a second primary light emitting surface directed in the second direction and a second secondary light emitting surface directed in the first direction. A first plurality of LEDs are optically coupled to the first waveguide and a second plurality of LEDs are optically coupled to the second waveguide. The first and second waveguides are independently operable. The first and second plurality of LEDs may comprise LED groups where each of the LED groups are independently controllable. The light emission pattern and light properties of the emitted light are controllable.

23 Claims, 20 Drawing Sheets

(51) Int. Cl.
*G02B 6/12* (2006.01)
*G02B 6/122* (2006.01)
*F21S 6/00* (2006.01)
*F21Y 115/10* (2016.01)

(52) U.S. Cl.
CPC ...... *F21V 23/0464* (2013.01); *F21V 23/0471* (2013.01); *F21V 23/0485* (2013.01); *G02B 6/0045* (2013.01); *G02B 6/0063* (2013.01); *G02B 6/0076* (2013.01); *G02B 6/0088* (2013.01); *G02B 6/122* (2013.01); *F21Y 2115/10* (2016.08); *G02B 6/0068* (2013.01); *G02B 6/0073* (2013.01); *G02B 6/0078* (2013.01); *G02B 2006/12083* (2013.01)

(58) Field of Classification Search
CPC .................. G02B 6/0078; G02B 6/122; G02B 2006/12083; G02B 6/0076; G02B 6/0088; F21S 6/005; F21S 6/008
See application file for complete search history.

(56) References Cited

U.S. PATENT DOCUMENTS

| | | |
|---|---|---|
| D67,806 S | 7/1925 | Hoyt et al. |
| 2,043,951 A | 6/1936 | Eksergian et al. |
| 2,992,587 A | 7/1961 | Hicks, Jr. et al. |
| 3,372,740 A | 3/1968 | Kastovich et al. |
| 3,532,871 A | 10/1970 | Shipman |
| D219,546 S | 12/1970 | Kaiser et al. |
| 4,146,297 A | 3/1979 | Alferness et al. |
| 4,441,787 A | 4/1984 | Lichtenberger |
| 4,714,983 A | 12/1987 | Lang et al. |
| D298,861 S | 12/1988 | Ewing et al. |
| 4,914,553 A | 4/1990 | Hamada et al. |
| 4,954,930 A | 9/1990 | Maegawa et al. |
| 4,977,486 A | 12/1990 | Gotoh et al. |
| 5,005,108 A | 4/1991 | Pristash et al. |
| 5,009,483 A | 4/1991 | Rockwell, III et al. |
| 5,026,161 A | 6/1991 | Werner |
| 5,040,098 A | 8/1991 | Tanaka et al. |
| 5,047,761 A | 9/1991 | Sell et al. |
| 5,061,404 A | 10/1991 | Wu et al. |
| 5,097,258 A | 3/1992 | Iwaki |
| 5,113,177 A | 5/1992 | Cohen et al. |
| 5,113,472 A | 5/1992 | Gualtieri et al. |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport et al. |
| 5,309,544 A | 5/1994 | Saxe et al. |
| 5,359,687 A | 10/1994 | McFarland et al. |
| 5,359,691 A | 10/1994 | Tai et al. |
| 5,396,350 A | 3/1995 | Beeson et al. |
| 5,398,179 A | 3/1995 | Pacheco et al. |
| 5,400,224 A | 3/1995 | Dunah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,506,924 A | 4/1996 | Inoue et al. |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus et al. |
| 5,541,039 A | 7/1996 | McFarland et al. |
| 5,548,670 A | 8/1996 | Koike et al. |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,624,202 A | 4/1997 | Grierson |
| 5,657,408 A | 8/1997 | Ferm et al. |
| 5,658,066 A | 8/1997 | Hirsch et al. |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan et al. |
| 5,696,865 A | 12/1997 | Beeson et al. |
| 5,702,176 A | 12/1997 | Engle et al. |
| 5,718,497 A | 2/1998 | Yokoyama et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik et al. |
| 5,777,857 A | 7/1998 | Degelmann et al. |
| 5,806,955 A | 9/1998 | Parkyn, Jr. et al. |
| 5,812,714 A | 9/1998 | Hulse et al. |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai et al. |
| 5,863,113 A | 1/1999 | Oe et al. |
| 5,872,883 A | 2/1999 | Ohba et al. |
| 5,897,201 A | 4/1999 | Simon et al. |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa et al. |
| 5,999,281 A | 12/1999 | Abbott et al. |
| 5,999,685 A | 12/1999 | Goto et al. |
| 6,002,079 A | 12/1999 | Shin et al. |
| 6,002,829 A | 12/1999 | Winston et al. |
| 6,007,209 A | 12/1999 | Pelka et al. |
| 6,043,951 A | 3/2000 | Lee |
| 6,044,196 A | 3/2000 | Winston et al. |
| 6,079,838 A | 6/2000 | Parker et al. |
| 6,097,549 A | 8/2000 | Jenkins et al. |
| 6,134,092 A | 10/2000 | Pelka et al. |
| 6,139,163 A | 10/2000 | Satoh et al. |
| 6,139,176 A | 10/2000 | Hulse et al. |
| 6,151,089 A | 11/2000 | Yang et al. |
| 6,155,692 A | 12/2000 | Ohkawa et al. |
| 6,155,693 A | 12/2000 | Spiegel et al. |
| 6,161,939 A | 12/2000 | Bansbach et al. |
| 6,164,790 A | 12/2000 | Lee |
| 6,164,791 A | 12/2000 | Gwo-Juh et al. |
| 6,167,182 A | 12/2000 | Shinohara et al. |
| 6,185,357 B1 | 2/2001 | Zou et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| 6,304,693 B1 | 10/2001 | Buelow, II et al. |
| 6,310,704 B1 | 10/2001 | Dogan et al. |
| 6,318,880 B1* | 11/2001 | Siminovitch ........... F21V 23/04 362/216 |
| 6,379,016 B1 | 4/2002 | Boyd et al. |
| 6,379,017 B2 | 4/2002 | Nakabayashi et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang |
| 6,485,157 B2 | 11/2002 | Ohkawa |

(56) References Cited

U.S. PATENT DOCUMENTS

| | | |
|---|---|---|
| 6,508,563 B2 | 1/2003 | Parker et al. |
| 6,523,986 B1 | 2/2003 | Hoffmann |
| 6,536,921 B1 | 3/2003 | Simon |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,637,924 B2 | 10/2003 | Pelka et al. |
| 6,647,199 B1 | 11/2003 | Pelka et al. |
| 6,652,109 B2 | 11/2003 | Nakamura |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,755,556 B2 | 6/2004 | Gasquet et al. |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,845,212 B2 | 1/2005 | Gardiner et al. |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |
| 6,971,758 B2 | 12/2005 | Inui et al. |
| 6,974,241 B2 | 12/2005 | Hara et al. |
| 6,992,335 B2 | 1/2006 | Ohkawa |
| 7,008,097 B1 | 3/2006 | Hulse |
| 7,010,212 B2 | 3/2006 | Emmons et al. |
| 7,021,805 B2 | 4/2006 | Amano et al. |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,052,157 B1 * | 5/2006 | Lau .................. F21S 6/002 362/216 |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,111,969 B2 | 9/2006 | Bottesch et al. |
| 7,118,253 B1 | 10/2006 | Simon |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,179,946 B2 | 2/2007 | Scholz et al. |
| 7,182,480 B2 | 2/2007 | Kan |
| 7,192,174 B2 | 3/2007 | Myoung |
| 7,195,374 B2 | 3/2007 | Saccomanno et al. |
| 7,204,634 B2 | 4/2007 | Chen et al. |
| 7,209,628 B2 | 4/2007 | Winston et al. |
| 7,213,940 B1 | 5/2007 | Van De Ven et al. |
| 7,218,830 B2 | 5/2007 | Iimura |
| 7,222,995 B1 | 5/2007 | Bayat et al. |
| 7,223,004 B2 | 5/2007 | Chen et al. |
| 7,246,931 B2 | 7/2007 | Hsieh et al. |
| 7,258,467 B2 | 8/2007 | Saccomanno et al. |
| 7,265,800 B2 | 9/2007 | Jagt et al. |
| 7,273,299 B2 | 9/2007 | Parkyn et al. |
| 7,290,906 B2 | 11/2007 | Suzuki et al. |
| 7,292,767 B2 | 11/2007 | Cheng |
| 7,322,733 B2 | 1/2008 | Chang et al. |
| 7,364,342 B2 | 4/2008 | Parker et al. |
| 7,369,918 B2 | 5/2008 | Cosgrove |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| 7,407,303 B2 * | 8/2008 | Wanninger .............. G02B 6/003 362/227 |
| 7,422,357 B1 | 9/2008 | Chang |
| 7,455,416 B2 | 11/2008 | Chen |
| 7,458,714 B2 | 12/2008 | Chang |
| 7,465,074 B2 | 12/2008 | Blumel |
| 7,486,854 B2 | 2/2009 | Van Ostrand et al. |
| 7,488,093 B1 | 2/2009 | Huang et al. |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| 7,614,759 B2 | 11/2009 | Negley |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,193 B2 | 12/2009 | Chang |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| 7,654,687 B2 | 2/2010 | Tsai et al. |
| 7,654,719 B2 | 2/2010 | Chang |
| 7,663,804 B2 | 2/2010 | Chang |
| 7,674,018 B2 | 3/2010 | Holder et al. |
| 7,695,165 B2 | 4/2010 | Chang |
| 7,696,531 B2 | 4/2010 | Miyao |
| 7,703,945 B2 | 4/2010 | Leung et al. |
| 7,703,950 B2 | 4/2010 | Ewert et al. |
| 7,703,967 B2 | 4/2010 | Parker |
| 7,710,663 B2 | 5/2010 | Barnes et al. |
| 7,722,224 B1 | 5/2010 | Coleman et al. |
| 7,722,241 B2 | 5/2010 | Chang |
| 7,724,321 B2 | 5/2010 | Hsieh et al. |
| 7,730,967 B2 | 6/2010 | Ballantyne et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| 7,766,515 B2 | 8/2010 | Condon et al. |
| 7,771,087 B2 | 8/2010 | Wilcox et al. |
| 7,775,697 B2 | 8/2010 | Hirano et al. |
| 7,776,236 B2 | 8/2010 | Shih et al. |
| 7,780,306 B2 | 8/2010 | Hoshi |
| 7,784,954 B1 | 8/2010 | Coleman |
| 7,798,695 B2 | 9/2010 | Parker |
| 7,806,581 B2 | 10/2010 | Lee |
| 7,810,949 B2 | 10/2010 | Chang |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| 7,826,698 B1 | 11/2010 | Meir et al. |
| 7,845,826 B2 | 12/2010 | Aylward et al. |
| 7,850,357 B2 | 12/2010 | Kim et al. |
| 7,857,487 B2 | 12/2010 | Wu et al. |
| 7,857,619 B2 | 12/2010 | Liu |

(56) References Cited

U.S. PATENT DOCUMENTS

| | | |
|---|---|---|
| 7,866,871 B2 | 1/2011 | Couzin et al. |
| 7,905,646 B2 | 3/2011 | Adachi et al. |
| 7,907,804 B2 | 3/2011 | Meir et al. |
| 7,909,496 B2 | 3/2011 | Matheson et al. |
| 7,914,192 B2 | 3/2011 | Coleman |
| 7,914,193 B2 | 3/2011 | Peifer et al. |
| 7,914,196 B2 | 3/2011 | Parker et al. |
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| 7,970,246 B2 | 6/2011 | Travis et al. |
| 7,976,204 B2 | 7/2011 | Li et al. |
| 7,991,257 B1 | 8/2011 | Coleman |
| 7,997,784 B2 | 8/2011 | Tsai |
| 8,002,450 B2 | 8/2011 | Van Ostrand et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,673 B2 | 11/2011 | Santoro |
| 8,047,696 B2 | 11/2011 | Ijzerman et al. |
| 8,052,316 B2 | 11/2011 | Lee |
| 8,054,409 B2 | 11/2011 | Hsieh et al. |
| 8,057,056 B2 | 11/2011 | Zhu et al. |
| 8,061,877 B2 | 11/2011 | Chang |
| 8,064,743 B2 | 11/2011 | Meir et al. |
| 8,067,884 B2 | 11/2011 | Li |
| 8,070,345 B2 | 12/2011 | Zhang et al. |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| 8,189,973 B2 | 5/2012 | Travis et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,212,263 B2 | 7/2012 | Bierhuizen et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| 8,277,106 B2 | 10/2012 | Van Gorkom et al. |
| 8,282,261 B2 | 10/2012 | Pance et al. |
| 8,282,853 B2 | 10/2012 | Mori et al. |
| 8,283,354 B2 | 10/2012 | Wilson et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 | 10/2012 | Coushaine et al. |
| 8,297,818 B2 | 10/2012 | Richardson |
| 8,301,002 B2 | 10/2012 | Shani |
| 8,310,158 B2 | 11/2012 | Coplin et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmermann |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,348,489 B2 | 1/2013 | Holman et al. |
| 8,351,744 B2 | 1/2013 | Travis et al. |
| 8,353,606 B2 | 1/2013 | Jeong |
| 8,369,678 B2 | 2/2013 | Chakmakjian et al. |
| 8,371,735 B2 | 2/2013 | Chen et al. |
| 8,376,582 B2 | 2/2013 | Catone et al. |
| 8,382,354 B2 | 2/2013 | Kim et al. |
| 8,382,387 B1 | 2/2013 | Sandoval |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shiau et al. |
| 8,434,892 B2 | 5/2013 | Zwak et al. |
| 8,434,893 B2 | 5/2013 | Boyer et al. |
| 8,434,913 B2 | 5/2013 | Vissenberg |
| 8,434,914 B2 | 5/2013 | Li et al. |
| 8,449,128 B2 | 5/2013 | Ko et al. |
| 8,449,142 B1 | 5/2013 | Martin et al. |
| 8,454,218 B2 | 6/2013 | Wang et al. |
| 8,461,602 B2 | 6/2013 | Lerman et al. |
| 8,469,559 B2 | 6/2013 | Williams |
| 8,475,010 B2 | 7/2013 | Vissenberg et al. |
| 8,482,186 B2 | 7/2013 | Wang et al. |
| 8,485,684 B2 | 7/2013 | Lou et al. |
| 8,506,112 B1 | 8/2013 | Dau et al. |
| 8,511,868 B2 | 8/2013 | Haugaard et al. |
| 8,534,896 B2 | 9/2013 | Boonekamp |
| 8,534,901 B2 | 9/2013 | Panagotacos et al. |
| 8,541,795 B2 | 9/2013 | Keller et al. |
| 8,547,022 B2 | 10/2013 | Summerford et al. |
| 8,564,004 B2 | 10/2013 | Tarsa et al. |
| 8,567,983 B2 | 10/2013 | Boyer et al. |
| 8,567,986 B2 | 10/2013 | Szprengiel et al. |
| 8,573,823 B2 | 11/2013 | Dau et al. |
| 8,585,253 B2 | 11/2013 | Duong et al. |
| 8,591,072 B2 | 11/2013 | Shani et al. |
| 8,591,090 B2 | 11/2013 | Lin |
| 8,593,070 B2 | 11/2013 | Wang et al. |
| D695,431 S | 12/2013 | Lay |
| 8,598,778 B2 | 12/2013 | Allen et al. |
| 8,602,586 B1 | 12/2013 | Dau et al. |
| 8,608,351 B2 | 12/2013 | Peifer |
| 8,616,746 B2 | 12/2013 | Shinohara |
| 8,618,735 B2 | 12/2013 | Coplin et al. |
| 8,632,214 B1 | 1/2014 | Tickner et al. |
| 8,641,219 B1 | 2/2014 | Johnson et al. |
| 8,657,479 B2 | 2/2014 | Morgan et al. |
| D702,377 S | 4/2014 | Lay |
| 8,696,173 B2 | 4/2014 | Urtiga et al. |
| 8,702,281 B2 | 4/2014 | Okada et al. |
| 8,724,052 B2 | 5/2014 | Hsieh et al. |
| 8,736,186 B2 | 5/2014 | Chobot |
| 8,740,440 B2 | 6/2014 | Mizuno et al. |
| 8,755,005 B2 | 6/2014 | Bierhuizen et al. |
| 8,770,821 B2 | 7/2014 | Ijzerman et al. |
| 8,780,299 B2 | 7/2014 | Ryu et al. |
| 8,829,821 B2 | 9/2014 | Chobot et al. |
| 8,833,996 B2 | 9/2014 | Dau et al. |

(56) References Cited

U.S. PATENT DOCUMENTS

| | | |
|---|---|---|
| 8,833,999 B2 | 9/2014 | Wang et al. |
| 8,840,276 B2 | 9/2014 | Shani et al. |
| 8,851,712 B2 | 10/2014 | Shani et al. |
| 8,864,360 B2 * | 10/2014 | Parker .................. F21V 29/70 362/612 |
| 8,870,430 B2 | 10/2014 | Kamikatano et al. |
| 8,870,431 B2 | 10/2014 | Lin et al. |
| 8,882,323 B2 | 11/2014 | Solomon et al. |
| 8,905,569 B2 | 12/2014 | Thomas et al. |
| 8,912,735 B2 | 12/2014 | Chobot et al. |
| 8,915,611 B2 | 12/2014 | Zhang |
| 8,917,962 B1 | 12/2014 | Nichol et al. |
| 8,950,919 B2 | 2/2015 | Chen |
| 8,960,969 B2 | 2/2015 | Freund |
| 8,975,827 B2 | 3/2015 | Chobot et al. |
| 9,046,225 B2 | 6/2015 | Meyers et al. |
| 9,081,125 B2 | 7/2015 | Dau et al. |
| 9,097,824 B2 * | 8/2015 | Vissenberg .......... G02B 6/0018 |
| 9,155,165 B2 | 10/2015 | Chobot |
| 9,155,166 B2 | 10/2015 | Chobot |
| 9,303,823 B2 | 4/2016 | Hu et al. |
| 9,433,061 B2 | 8/2016 | Chobot |
| 9,572,226 B2 | 2/2017 | Motley et al. |
| 2001/0019479 A1 | 9/2001 | Nakabayashi et al. |
| 2002/0061178 A1 | 5/2002 | Winston et al. |
| 2002/0172039 A1 | 11/2002 | Inditsky |
| 2003/0034985 A1 | 2/2003 | Needham Riddle et al. |
| 2003/0146688 A1 | 8/2003 | Kitazawa et al. |
| 2004/0008952 A1 | 1/2004 | Kragl |
| 2004/0080938 A1 | 4/2004 | Holman et al. |
| 2004/0135933 A1 | 7/2004 | Leu et al. |
| 2004/0146241 A1 | 7/2004 | Deladurantaye et al. |
| 2004/0213003 A1 | 10/2004 | Lauderdale et al. |
| 2004/0240217 A1 | 12/2004 | Rice |
| 2005/0024744 A1 | 2/2005 | Falicoff et al. |
| 2005/0111235 A1 | 5/2005 | Suzuki et al. |
| 2005/0140848 A1 | 6/2005 | Yoo et al. |
| 2005/0201103 A1 | 9/2005 | Saccomanno et al. |
| 2005/0210643 A1 | 9/2005 | Mezei et al. |
| 2005/0286251 A1 | 12/2005 | Smith |
| 2006/0002146 A1 | 1/2006 | Baba |
| 2006/0072203 A1 | 4/2006 | Lee |
| 2006/0076568 A1 | 4/2006 | Keller et al. |
| 2006/0147151 A1 | 7/2006 | Wanninger et al. |
| 2006/0187651 A1 | 8/2006 | Kim et al. |
| 2006/0262521 A1 | 11/2006 | Piepgras et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0139965 A1 | 6/2007 | Liao |
| 2007/0189033 A1 | 8/2007 | Watanabe et al. |
| 2007/0223247 A1 | 9/2007 | Lee et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2007/0279933 A1 | 12/2007 | Shiau et al. |
| 2008/0002399 A1 | 1/2008 | Villard et al. |
| 2008/0030650 A1 | 2/2008 | Kitagawa et al. |
| 2008/0037284 A1 | 2/2008 | Rudisill |
| 2008/0094853 A1 | 4/2008 | Kim et al. |
| 2008/0137695 A1 | 6/2008 | Takahashi et al. |
| 2008/0186273 A1 | 8/2008 | Krijn et al. |
| 2008/0192458 A1 | 8/2008 | Li |
| 2008/0199143 A1 | 8/2008 | Turner |
| 2008/0211990 A1 | 9/2008 | Sakai |
| 2008/0232135 A1 | 9/2008 | Kinder et al. |
| 2008/0266879 A1 | 10/2008 | Chang |
| 2008/0266901 A1 | 10/2008 | Chang |
| 2008/0285310 A1 | 10/2008 | Aylward et al. |
| 2008/0285304 A1 | 11/2008 | Rankin, Jr. et al. |
| 2009/0027893 A1 | 1/2009 | Chang |
| 2009/0091948 A1 | 4/2009 | Wang et al. |
| 2009/0103293 A1 | 4/2009 | Harbers et al. |
| 2009/0175050 A1 | 7/2009 | Marttila et al. |
| 2009/0196071 A1 | 8/2009 | Matheson et al. |
| 2009/0257242 A1 | 10/2009 | Wendman |
| 2009/0297090 A1 | 12/2009 | Bogner et al. |
| 2009/0309494 A1 | 12/2009 | Patterson et al. |
| 2009/0310367 A1 | 12/2009 | Kuo |
| 2009/0316414 A1 | 12/2009 | Yang et al. |
| 2010/0008088 A1 | 1/2010 | Koizumi et al. |
| 2010/0008628 A1 | 1/2010 | Shani |
| 2010/0027257 A1 | 2/2010 | Boonekamp et al. |
| 2010/0046219 A1 | 2/2010 | Pijlman et al. |
| 2010/0053959 A1 | 3/2010 | Ijzerman et al. |
| 2010/0073597 A1 | 3/2010 | Bierhuizen et al. |
| 2010/0073911 A1 | 3/2010 | Ohkawa |
| 2010/0079843 A1 | 4/2010 | Derichs et al. |
| 2010/0079980 A1 | 4/2010 | Sakai |
| 2010/0110673 A1 | 5/2010 | Bergman et al. |
| 2010/0110679 A1 | 5/2010 | Teng et al. |
| 2010/0118531 A1 | 5/2010 | Montagne |
| 2010/0128483 A1 | 5/2010 | Reo et al. |
| 2010/0133422 A1 | 6/2010 | Lin et al. |
| 2010/0157577 A1 | 6/2010 | Montgomery et al. |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0231143 A1 | 9/2010 | May et al. |
| 2010/0238645 A1 | 9/2010 | Bailey |
| 2010/0238671 A1 | 9/2010 | Catone et al. |
| 2010/0246158 A1 | 9/2010 | Van Gorkom et al. |
| 2010/0253881 A1 | 10/2010 | Han et al. |
| 2010/0254129 A1 | 10/2010 | Le Toquin et al. |
| 2010/0301360 A1 | 12/2010 | van de Ven et al. |
| 2010/0302135 A1 | 12/2010 | Larson et al. |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0315833 A1 | 12/2010 | Holman et al. |
| 2010/0320904 A1 | 12/2010 | Meir |
| 2010/0328936 A1 | 12/2010 | Pance et al. |
| 2011/0007505 A1 | 1/2011 | Wang |
| 2011/0013397 A1 | 1/2011 | Catone et al. |
| 2011/0013420 A1 | 1/2011 | Coleman et al. |
| 2011/0013421 A1 | 1/2011 | Um |
| 2011/0037388 A1 | 2/2011 | Lou et al. |
| 2011/0044022 A1 | 2/2011 | Ko et al. |
| 2011/0044582 A1 | 2/2011 | Travis et al. |
| 2011/0051457 A1 | 3/2011 | Chen |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063855 A1 | 3/2011 | Vissenberg |
| 2011/0069843 A1 | 3/2011 | Cohen et al. |
| 2011/0122616 A1 | 5/2011 | Hochstein |
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0180818 A1 | 7/2011 | Lerman et al. |
| 2011/0187273 A1 | 8/2011 | Summerford et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0248287 A1 | 10/2011 | Yuan et al. |
| 2011/0249467 A1 | 10/2011 | Boonekamp |
| 2011/0261570 A1 | 10/2011 | Okada et al. |
| 2011/0273079 A1 | 11/2011 | Pickard et al. |
| 2011/0273882 A1 | 11/2011 | Pickard |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |

(56) References Cited

U.S. PATENT DOCUMENTS

| | | |
|---|---|---|
| 2011/0317436 A1 | 12/2011 | Kuan |
| 2012/0008338 A1 | 1/2012 | Ono et al. |
| 2012/0014128 A1* | 1/2012 | Lin ..................... G02B 6/0021 362/580 |
| 2012/0020108 A1 | 1/2012 | Chang |
| 2012/0026728 A1 | 2/2012 | Lou et al. |
| 2012/0026828 A1 | 2/2012 | Fjellstad et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0057325 A1 | 3/2012 | Hikmet |
| 2012/0068615 A1 | 3/2012 | Duong et al. |
| 2012/0069575 A1 | 3/2012 | Koh et al. |
| 2012/0069579 A1 | 3/2012 | Koh et al. |
| 2012/0069595 A1 | 3/2012 | Catalano |
| 2012/0075873 A1 | 3/2012 | Cooper |
| 2012/0113676 A1 | 5/2012 | Van Dijk et al. |
| 2012/0114284 A1 | 5/2012 | Ender |
| 2012/0120651 A1 | 5/2012 | Peck |
| 2012/0140461 A1 | 6/2012 | Pickard |
| 2012/0147624 A1 | 6/2012 | Li et al. |
| 2012/0152490 A1 | 6/2012 | Wen et al. |
| 2012/0161009 A1 | 6/2012 | Kothari et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Petcavich et al. |
| 2012/0188774 A1 | 7/2012 | Okada |
| 2012/0212957 A1 | 8/2012 | Hyun et al. |
| 2012/0230019 A1 | 9/2012 | Peifer |
| 2012/0242930 A1 | 9/2012 | Ryu et al. |
| 2012/0243259 A1 | 9/2012 | Zhou et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0287668 A1* | 11/2012 | Richardson ............. F21V 29/00 362/602 |
| 2012/0287677 A1 | 11/2012 | Wheatley et al. |
| 2012/0298181 A1 | 11/2012 | Cashion et al. |
| 2012/0307496 A1 | 12/2012 | Phillips, III et al. |
| 2012/0320626 A1 | 12/2012 | Quilici et al. |
| 2012/0326614 A1 | 12/2012 | Tsuji et al. |
| 2013/0003348 A1 | 1/2013 | Meir et al. |
| 2013/0003363 A1 | 1/2013 | Lu et al. |
| 2013/0003409 A1 | 1/2013 | Vissenberg et al. |
| 2013/0010464 A1 | 1/2013 | Shuja et al. |
| 2013/0028557 A1 | 1/2013 | Lee et al. |
| 2013/0033867 A1 | 2/2013 | Coplin et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0039090 A1 | 2/2013 | Dau et al. |
| 2013/0044480 A1 | 2/2013 | Sato et al. |
| 2013/0077298 A1 | 3/2013 | Steele et al. |
| 2013/0107518 A1 | 5/2013 | Boyer et al. |
| 2013/0107527 A1 | 5/2013 | Boyer et al. |
| 2013/0107528 A1 | 5/2013 | Boyer et al. |
| 2013/0128593 A1 | 5/2013 | Luo |
| 2013/0141937 A1 | 6/2013 | Katsuta et al. |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0300310 A1 | 11/2013 | Hu |
| 2013/0317784 A1 | 11/2013 | Huang et al. |
| 2013/0322116 A1 | 12/2013 | Pijlman et al. |
| 2013/0328073 A1 | 12/2013 | Lowes et al. |
| 2013/0336001 A1 | 12/2013 | Boonekamp |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0043850 A1 | 2/2014 | Thompson et al. |
| 2014/0071687 A1 | 3/2014 | Tickner et al. |
| 2014/0168955 A1 | 6/2014 | Gershaw |
| 2014/0211457 A1 | 7/2014 | Tarsa et al. |
| 2014/0211462 A1 | 7/2014 | Keller et al. |
| 2014/0211476 A1 | 7/2014 | Yuan et al. |
| 2014/0211495 A1 | 7/2014 | Yuan et al. |
| 2014/0211496 A1 | 7/2014 | Durkee |
| 2014/0211497 A1 | 7/2014 | Yuan et al. |
| 2014/0211502 A1 | 7/2014 | Keller et al. |
| 2014/0211503 A1 | 7/2014 | Tarsa |
| 2014/0211504 A1 | 7/2014 | Yuan et al. |
| 2014/0211508 A1 | 7/2014 | Yuan et al. |
| 2014/0212090 A1 | 7/2014 | Wilcox et al. |
| 2014/0268762 A1 | 9/2014 | Raleigh et al. |
| 2014/0268790 A1 | 9/2014 | Chobot et al. |
| 2014/0268875 A1 | 9/2014 | Durkee |
| 2014/0268879 A1 | 9/2014 | Mizuyama et al. |
| 2014/0270672 A1 | 9/2014 | Durkee |
| 2014/0286052 A1 | 9/2014 | McCollum et al. |
| 2014/0334126 A1 | 11/2014 | Speier et al. |
| 2014/0347885 A1 | 11/2014 | Wilcox et al. |
| 2014/0355297 A1 | 12/2014 | Castillo et al. |
| 2014/0355302 A1 | 12/2014 | Wilcox et al. |
| 2015/0003059 A1 | 1/2015 | Haitz et al. |
| 2015/0008827 A1 | 1/2015 | Carrigan et al. |
| 2015/0008828 A1 | 1/2015 | Carrigan et al. |
| 2015/0008831 A1 | 1/2015 | Carrigan et al. |
| 2015/0015145 A1 | 1/2015 | Carrigan et al. |
| 2015/0048758 A1 | 2/2015 | Carrigan et al. |
| 2015/0049511 A1 | 2/2015 | Tarsa et al. |
| 2015/0055369 A1 | 2/2015 | Tarsa et al. |
| 2015/0055371 A1 | 2/2015 | van de Ven et al. |
| 2015/0102729 A1 | 4/2015 | Creasman et al. |
| 2015/0109820 A1 | 4/2015 | Wilcox et al. |
| 2015/0160396 A1 | 6/2015 | Wilcox et al. |
| 2015/0177439 A1 | 6/2015 | Durkee et al. |
| 2015/0192742 A1 | 7/2015 | Tarsa et al. |
| 2015/0195883 A1 | 7/2015 | Harris et al. |
| 2015/0198760 A1 | 7/2015 | Wilcox et al. |
| 2015/0204491 A1 | 7/2015 | Yuan et al. |
| 2015/0260905 A1 | 9/2015 | Yuan et al. |
| 2015/0264780 A1 | 9/2015 | Harris et al. |
| 2015/0049507 A1 | 10/2015 | Shani et al. |
| 2015/0312983 A1 | 10/2015 | Hu et al. |
| 2015/0351187 A1 | 12/2015 | McBryde et al. |
| 2017/0205552 A1* | 7/2017 | Gierens ............. B32B 17/10779 |

FOREIGN PATENT DOCUMENTS

| | | | |
|---|---|---|---|
| DE | 10302563 | A1 | 7/2004 |
| DE | 10302564 | A1 | 7/2004 |
| DE | 102006009325 | A1 | 9/2007 |
| DE | 102006011296 | A1 | 9/2007 |
| DE | 102006013343 | A1 | 9/2007 |
| JP | 10173870 | A | 6/1998 |
| JP | 2000147264 | A | 5/2000 |
| JP | 3093080 | U | 4/2003 |
| JP | 2004227934 | A | 8/2004 |
| JP | 2006131444 | A | 5/2006 |
| JP | 2006221922 | A | 8/2006 |
| JP | 2007123130 | A | 5/2007 |
| WO | 9621122 | A1 | 7/1996 |
| WO | 9621884 | A1 | 7/1996 |
| WO | 9904531 | A1 | 1/1999 |
| WO | 0102772 | A1 | 1/2001 |
| WO | 03031869 | A1 | 4/2003 |

(56) References Cited

FOREIGN PATENT DOCUMENTS

| WO | WO 2004005983 A1 * | 1/2004 | ........... G02B 6/0063 |
|---|---|---|---|
| WO | 2008152561 A1 | 12/2008 | |
| WO | 2009012484 A1 | 1/2009 | |
| WO | 2011130648 A2 | 10/2011 | |
| WO | 2013078463 A1 | 5/2013 | |
| WO | 2013082537 A1 | 6/2013 | |
| WO | 2014120672 A2 | 8/2014 | |
| WO | 2014120672 A3 | 8/2014 | |
| WO | 2014120968 A1 | 8/2014 | |
| WO | 2014145283 A1 | 9/2014 | |
| WO | WO 2015028328 A2 * | 3/2015 | .............. F21S 10/02 |

OTHER PUBLICATIONS

U.S. Appl. No. 14/472,064, Office Action, dated Mar. 9, 2018.
U.S. Appl. No. 62/292,528, filed Feb. 8, 2016.
IPRP for International Application No. PCT/US2014/028938, dated Sep. 24, 2015, Applicant, Cree, Inc., (12 pages).
Non-final Office action dated Jul. 31, 2015, for U.S. Appl. No. 14/015,801, Applicant, Cree, Inc. (48 pages).
Non-final Office action dated Jun. 10, 2015, for U.S. Appl. No. 13/842,521, Applicant, Cree, Inc. (53 pages).
Non-final Office action dated Apr. 1, 2015, for U.S. Appl. No. 13/841,074, Applicant, Cree, Inc. (57 pages).
Final Office action dated Jun. 2, 2015, for U.S. Appl. No. 13/841,622, Applicant, Cree, Inc. (58 pages).
Non-final Office action dated Mar. 24, 2015, for U.S. Appl. No. 13/840,563, Applicant, Cree, Inc. (36 pages).
Final Office action dated Jun. 11, 2015, for U.S. Appl. No. 13/938,877, Applicant, Cree, Inc. (40 pages).
Non-final Office action dated Apr. 30, 2015, for U.S. Appl. No. 14/101,132, Applicant, Cree, Inc. (21 pages).
Non-final Office action dated Aug. 12, 2015, for U.S. Appl. No. 14/577,730, Applicant, Cree, Inc. (52 pages).
Non-final Office action dated May 20, 2015, for U.S. Appl. No. 14/101,051, Applicant, Cree, Inc. (17 pages).
Non-final Office action dated Feb. 27, 2015, for U.S. Appl. No. 14/292,778, Applicant, Cree, Inc. (10 pages).
Non-final Office action dated Sep. 4, 2015, for U.S. Appl. No. 14/101,132, Applicant, Cree, Inc. (48 pages).
Non-final Office action dated Aug. 31, 2015, for U.S. Appl. No. 14/292,778, Applicant, Cree, Inc. (49 pages).
Invitation to Pay Additional Fees for International Application No. PCT/US2015/032011 dated Aug. 6, 2015, Applicant, Cree, Inc. (2 pages).
Invitation to Pay Additional Fees for International Application No. PCT/US2015/020601 dated Jun. 5, 2015, Applicant, Cree, Inc. (2 pages).
Non-final Office action dated Jun. 30, 2015, for U.S. Appl. No. 14/583,415, Applicant, Cree, Inc. (216 pages).
U.S. Appl. No. 62/292,528, filed Feb. 8, 2016, (198 pages).
U.S. Appl. No. 15/587,442, filed May 5, 2017, (89 pages).
Iijima et al., "Document Scanner Using Polymer Waveguides With a Microlens Array," Optical Engineering, vol. 41, Issue 11, pp. 2743-2748, Oct. 28, 2002 (4 pages).
Ji et al., "Electrically Controllable Microlens Array Fabricated by Anisotropic Phase Separation From Liquid-Crystal and Polymer Composite Materials," vol. 28, No. 13, Optics Letters, pp. 1147-1149, Jul. 1, 2003 (4 pages).
Drain, Kieran, "Transformations in Lighting: 2011 DOE Solid-State Lighting R&D Workshop, Panel 3: Novel Lighting Concepts for Large Interior Spaces," PowerPoint presentation printed Nov. 2013 (23 pages).
Web page at http://www.oluce.com/en/lamps/table/colombo-281-detail, printed Nov. 19, 2013 (2 pages).
International Search Report and Written Opinion for International Application No. PCT/US2014/013840, dated Jul. 28, 2014, Applicant, Cree, Inc. (17 pages).

International Search Report and Written Opinion for International Application No. PCT/US14/30017, dated Aug. 1, 2014, Applicant, Cree, Inc., (21 pages).
International Search Report and Written Opinion for International Application No. PCT/US2014/072848, dated Mar. 25, 2015, Applicant, Cree, Inc., (17 pages).
International Search Report and Written Opinion for International Application No. PCT/US2014/013408, dated Jul. 17, 2014, Applicant, Cree, Inc. (21 pages).
IPRP for International Application No. PCT/US2014/013400, dated Sep. 24, 2015, Applicant, Cree, Inc., (14 pages).
International Search Report and Written Opinion dated Jul. 28, 2014, for International Application No. PCT/US2014/28938, Applicant, Cree, Inc. (19 pages).
International Search Report and Written Opinion dated Jul. 24, 2014, for International Application No. PCT/US2014/28887, Applicant, Cree, Inc. (15 pages).
International Search Report and Written Opinion for International Application No. PCT/US2015/020601, dated Jul. 31, 2015, Applicant, Cree, Inc. (23 pages).
European Extended Search Report dated May 19, 2015 for EP Application No. 14192325.0, Applicant, Cree, Inc. (5 pages).
International Search Report and Written Opinion dated Mar. 25, 2015, for International Application No. PCT/US2014/072860, Applicant, Cree, Inc. (14 pages).
International Search Report and Written Opinion for International Application No. PCT/US15/32050, Applicant, Cree, Inc., dated Oct. 19, 2015 (19 pages).
International Search Report and Written Opinion dated Jan. 11, 2016, for International Application No. PCT/US2015/032040, Applicant, Cree, Inc., (16 pages).
USPTO Office Action dated Nov. 13, 2015, for U.S. Appl. No. 13/841,622, Applicant, Cree, Inc. (7 pages).
Web page at http://www.fusionoptix.com/lighting/components/array-optics.htm, printed May 9, 2013 (2 pages).
Invitation to Pay Additional Fees for International Application No. PCT/US2014/013840, dated May 8, 2014, Applicant, Cree, Inc. (2 pages).
Invitation to Pay Additional Fees for International Application No. PCT/US2014/013408, dated May 8, 2014, Applicant, Cree, Inc. (2 pages).
U.S. Appl. No. 13/657,421, filed Oct. 22, 2012 (38 pages).
Invitation to Pay Additional Fees for International Application No. PCT/US2015/032040 dated Aug. 6, 2015, Applicant, Cree, Inc. (2 pages).
U.S. Appl. No. 14/291,829, filed May 30, 2014, Inventors, Yuan et al. (65 pages).
U.S. Appl. No. 14/292,001, filed May 30, 2014, Inventors, Hu et al. (38 pages).
U.S. Appl. No. 14/292,286, filed May 30, 2014, Inventors, McBryde et al. (103 pages).
U.S. Appl. No. 61/932,058, filed Jan. 27, 2014, Inventors, Carrigan et al., (203 pages).
U.S. Appl. No. 14/618,884, filed Feb. 10, 2015, Inventors, Castillo et al. (56 pages).
U.S. Appl. No. 14/462,322, filed Aug. 18, 2014, Inventors, Castillo et al. (31 pages).
U.S. Appl. No. 62/088,375, filed Dec. 5, 2014, Inventors, Hussell et al. (51 pages).
U.S. Appl. No. 14/618,819, filed Feb. 10, 2015, Inventors, Bendtsen et al. (37 pages).
U.S. Appl. No. 14/801,476, filed Jul. 16, 2015, Inventors, de Sugny et al. (38 pages).
U.S. Appl. No. 14/472,078, filed Aug. 28, 2014, Inventors, Tarsa et al. (60 pages).
IPRP for International Application No. PCT/US2014/013840, dated Aug. 13, 2015, Applicant, Cree, Inc. (10 pages).
IPRP for International Application No. PCT/US2014/013891, dated Aug. 13, 2015, Applicant, Cree, Inc., (8 pages).
IPRP for International Application No. PCT/US2014/013934, dated Aug. 13, 2015, Applicant, Cree, Inc., (11 pages).
IPRP for International Application No. PCT/US2014/013854, dated Jun. 5, 2014, Applicant, Cree, Inc., (9 pages).

(56) References Cited

OTHER PUBLICATIONS

IPRP for International Application No. PCT/US2014/013931, dated Aug. 13, 2015, Applicant, Cree, Inc., (15 pages).
IPRP for International Application No. PCT/US2014/013408, dated Aug. 13, 2015, Applicant, Cree, Inc., (15 pages).
U.S. Appl. No. 14/839,557, filed Aug. 28, 2015, Inventors, Wilcenski et al. (63 pages).
IPRP for International Application No. PCT/US2014/028887, dated Sep. 24, 2015, Applicant, Cree, Inc., (9 pages).
U.S. Appl. No. 14/472,064, Restriction Requirement, dated Jan. 30, 2017, 6 pages.
U.S. Appl. No. 14/472,064, Office Action, dated Jun. 22, 2017, 18 pages.
U.S. Appl. No. 14/472,064, Final Office Action, dated Oct. 16, 2017.

\* cited by examiner

LUMINAIRE WITH CONTROLLABLE LIGHT EMISSION

This application claims benefit of priority under 35 U.S.C. § 119(e) to the filing date of U.S. Provisional Application No. 62/333,000, as filed on May 6, 2016, which is incorporated herein by reference in its entirety.

REFERENCE REGARDING FEDERALLY SPONSORED RESEARCH OR DEVELOPMENT

This invention was made with government support under Contract No. DE-EE0007620 awarded by The Department of Energy. The government has certain rights in the invention.

FIELD OF DISCLOSURE

The present subject matter relates to lighting devices, and more particularly, to a luminaire incorporating waveguides for general illumination.

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling elements(s) direct light into the distribution element(s) and condition the light to interact with the subsequent components. The one or more distribution elements control how light flows through the waveguide and is dependent on the waveguide geometry and material. The extraction element(s) determine how light is emitted by controlling where and in what direction the light exits the waveguide.

After light has been coupled into the waveguide, it is guided and conditioned to the locations of extraction. In accordance with well-known principles of total internal reflectance the light rays continue to travel through the waveguide until such rays strike a light extraction surface and the light rays escape the waveguide. By appropriately shaping the waveguide surfaces, the position from which light is emitted and the angular distribution of the emitted light may be controlled. The design of the coupling elements, the distribution elements and the extraction devices provide control over the appearance of the waveguide, its resulting distribution of emitted light, and system optical efficiency.

SUMMARY

In one embodiment a luminaire comprises a first waveguide having a first primary light emitting surface directed in a first direction and a first secondary light emitting surface directed in a second direction, and a second waveguide having a second primary light emitting surface directed in the second direction and a second secondary light emitting surface directed in the first direction. The first secondary light emitting surface and the second secondary light emitting surface are disposed adjacent one another. At least one first LED is optically coupled to the first waveguide such that activation of the first LED(s) causes light to be emitted from the first primary light emitting surface and at least one second LED is optically coupled to the second waveguide such that activation of the second LED(s) causes light to be emitted from the second primary light emitting surface. The first LED(s) and the second LED(s) are independently operable.

The first LED(s) may comprise a first plurality of LED groups where each of the first plurality of LED groups may be independently controllable. The second LED(s) may comprise a second plurality of LED groups where each of the second plurality of LED groups may be independently controllable. The first waveguide may comprise a first plurality of waveguide sections where one of the first plurality of LED groups is associated with one of the first plurality of waveguide sections and each of the first plurality of LEDs groups may be independently controllable. The second waveguide may comprise a second plurality of waveguide sections where one of the second plurality of LED groups is associated with one of the second plurality of waveguide sections and each of the second plurality of LED groups may be independently controllable. The first plurality of waveguide sections may be coextensive with the second plurality of waveguide sections. A controller may control the output of the first LED(s) and the second LED(s) based on an input from a detector. The detector may comprise an ambient light detector for detecting ambient light. The controller may alter the lux output level of the first LED(s) and the second LED(s) in response to input from the ambient light detector. The detector may comprise an occupancy detector for detecting a stimulus adjacent the luminaire. The controller may alter the lux output level of at least one of the first LED(s) and the second LED(s) in response to input from the occupancy detector. A controller may control the output of the first LED(s) and the second LED(s) based on an input from a user control. The user control may comprise a capacitive sensor. The capacitive sensor may independently control the on/off state and dimming levels of at least one of the first LED(s) and the second LED(s). The user control may comprise a remote control that communicates with the controller over a wireless connection. The first plurality of waveguide sections may be coplanar and the second plurality of waveguide sections may be coplanar such that independent energization of the first plurality of groups of LEDs and the second plurality of groups of LEDs generates a directional light pattern. The directional light pattern may be variable along an axis of orientation of the first waveguide and the second waveguide and in a plane perpendicular to the axis of orientation. The first waveguide and the second waveguide may be supported on a support structure such that the primary light emitting surfaces are disposed horizontally.

In some embodiments, a luminaire comprises a plurality of first waveguide sections, each of the plurality of first waveguide sections having a first primary light emitting surface directed in a first direction and a first secondary light emitting surface directed in a second direction and a plurality of second waveguide sections, each of the plurality of second waveguide sections having a second primary light emitting surface directed in the second direction and a second secondary light emitting surface directed in the first direction. The first secondary light emitting surfaces and the second secondary light emitting surfaces are disposed adjacent one another. At least one first LED is optically coupled to each of the first waveguide sections and at least one second LED is optically coupled to each of the second waveguide sections where the at least one first LED and the at least one second LED are independently operable. The first waveguide sections may be in a one-to-one relationship with the second waveguide sections.

In some embodiments a free standing luminaire comprises a support structure being supportable on a surface. The support structure supports a waveguide. A plurality of LEDs are optically coupled to the waveguide such that activation of the plurality of LEDs causes light to be emitted from the waveguide, where the light emission pattern and light properties of the emitted light are controllable.

The light properties may comprise at least one of color, color temperature, brightness, CRI, and color gamut. The emission pattern may comprise light emitted at least in one of an axial direction and a lateral direction.

BRIEF DESCRIPTION OF THE DRAWINGS

FIGS. 24A, 242B, 24C and 25 are example illumination patterns developed by the luminaire of the invention;

DETAILED DESCRIPTION

Figure 1:
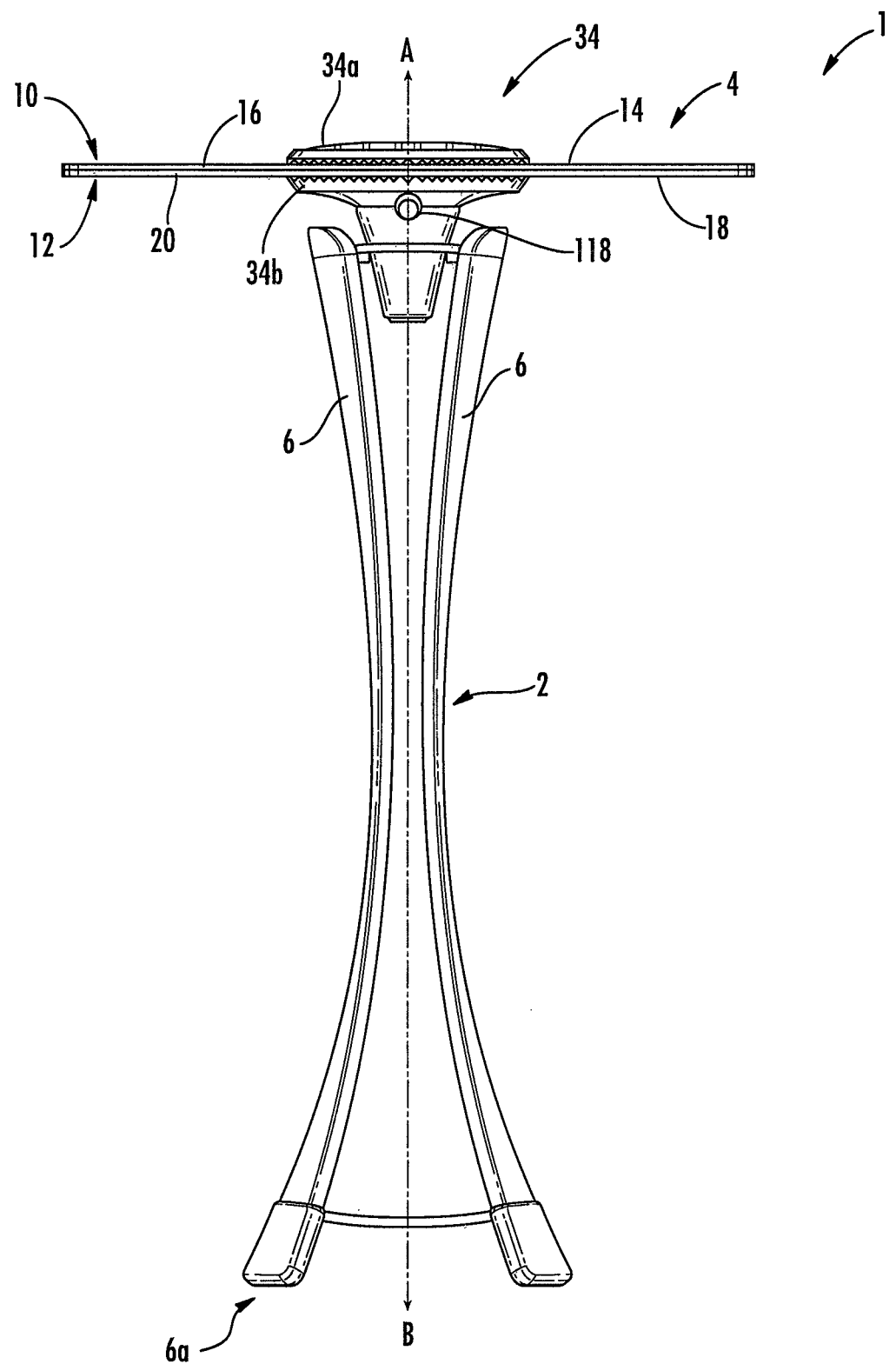
FIG. 1 is a front view of an embodiment of an embodiment of a luminaire.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

The luminaire as described herein provides a controllable light source that in some embodiments may provide general illumination and may function as a desk lamp, floor lamp or other lamp. The luminaire comprises a light emitting portion comprised of at least two light guides or waveguides (hereinafter "waveguides") emitting light in two different axial directions where the directions may be generally opposite directions (e.g., 'upwards' and 'downwards', 'left' and 'right', etc.), controllable independently in intensity, emission pattern and/or light properties. As used herein "light properties" of the emitted light refers to properties of the light including, color, color temperature, brightness, CRI (color rendering index), and color gamut (the entire range of colors available on a particular device). The light emitting portion may be predominantly transparent or, in some embodiments, a reflective element may be inserted between the two waveguides to separate the oppositely directed light emissions. The combination of two waveguides allows, for example, for downwards illumination towards a reading or working surface and for upwards illumination towards a ceiling to provide omni-directional illumination.

In some embodiments, radial or lateral control over the light distribution may be provided in addition to the axial control such that the light distribution is controllable in two generally orthogonal planes. In one configuration, for example, a light source provides light into each of the waveguides at an internal edge of the waveguides. The light sources may be divided into groups such as quadrants such that when the luminaire is placed near a wall or in a corner, the light source groups pointing towards the wall or corner may be dimmed (to reduce less useful indirect lighting) in favor of light directed away from the wall to provide more direct illumination (e.g. in 'reading' mode). Alternately, light towards the wall or corner may be increased relative to light directed away from the wall to provide more indirect illumination (e.g., TV viewing mode).

The overall illumination pattern can be adjusted to obtain different light distributions to increase overall lighting control and allow for changes in the lighting ambiance. Moreover, the control provided by the two oppositely disposed, independently controlled waveguides provides energy savings.

The emission pattern of the oppositely directed waveguides can be designed to accommodate different situations. The user can set the preferred illumination levels via local controls (e.g. independent capacitive sliders or a single capacitive slider with multitouch capabilities) or remote controls (e.g. Bluetooth via mobile phone). In the case of local control, a 360° multitouch scroll wheel at the base of the luminaire allows access to controls from any direction. The luminaire may also detect stimuli, such as occupancy, in the surrounding environment and automatically dim or turn off the light sources to reduce energy consumption when no stimuli are detected. Furthermore, the luminaire may be equipped with a real time ambient light sensor that allows the luminaire to maintain a constant light level. Further connectivity can be obtained with Wi-fi and integration using Cree SmartCast technology. All components are miniaturized and fit within the housing holding the waveguides.

Figure 2:
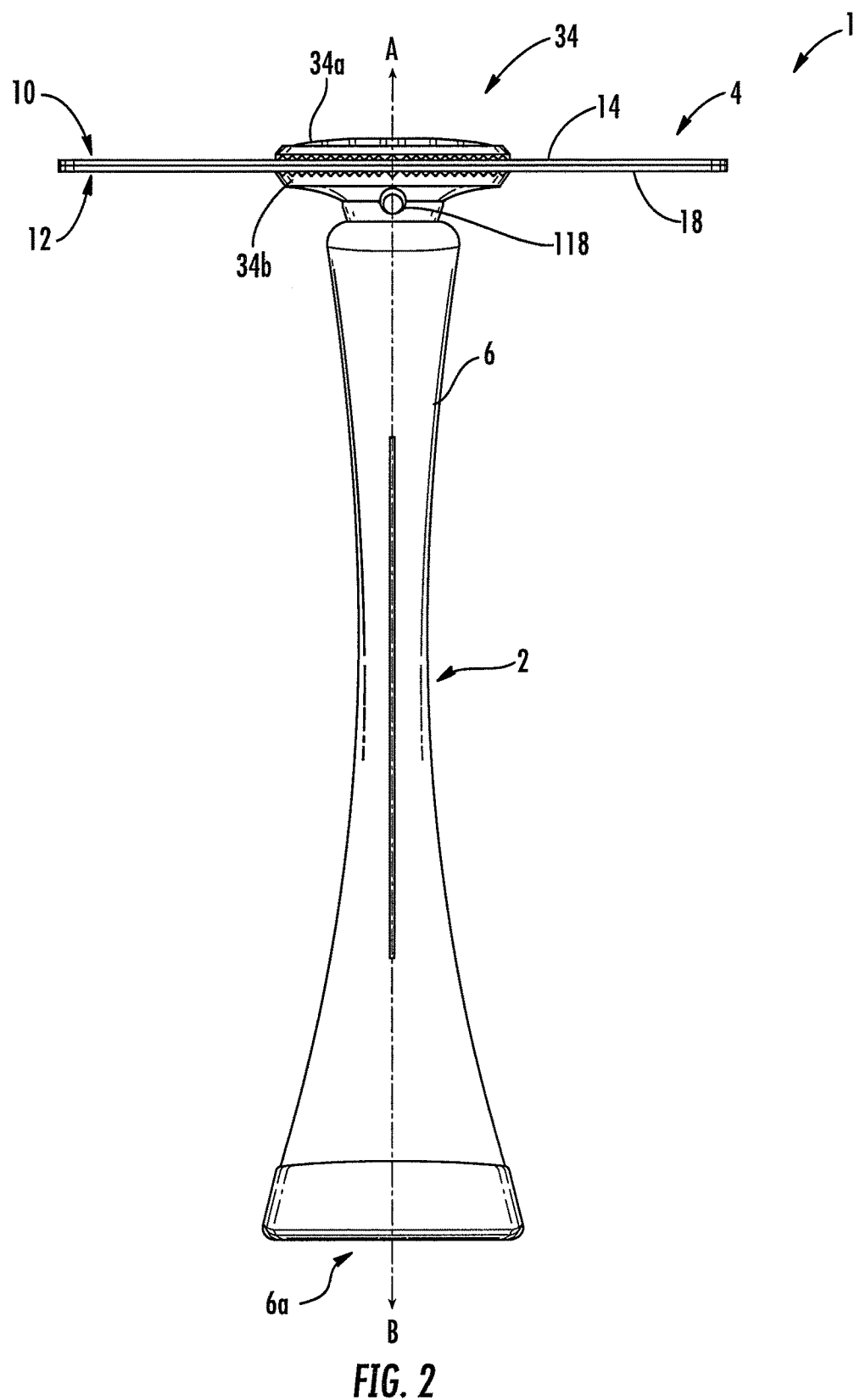
FIG. 2 is a side view of the luminaire of FIG. 1.
Figure 3:
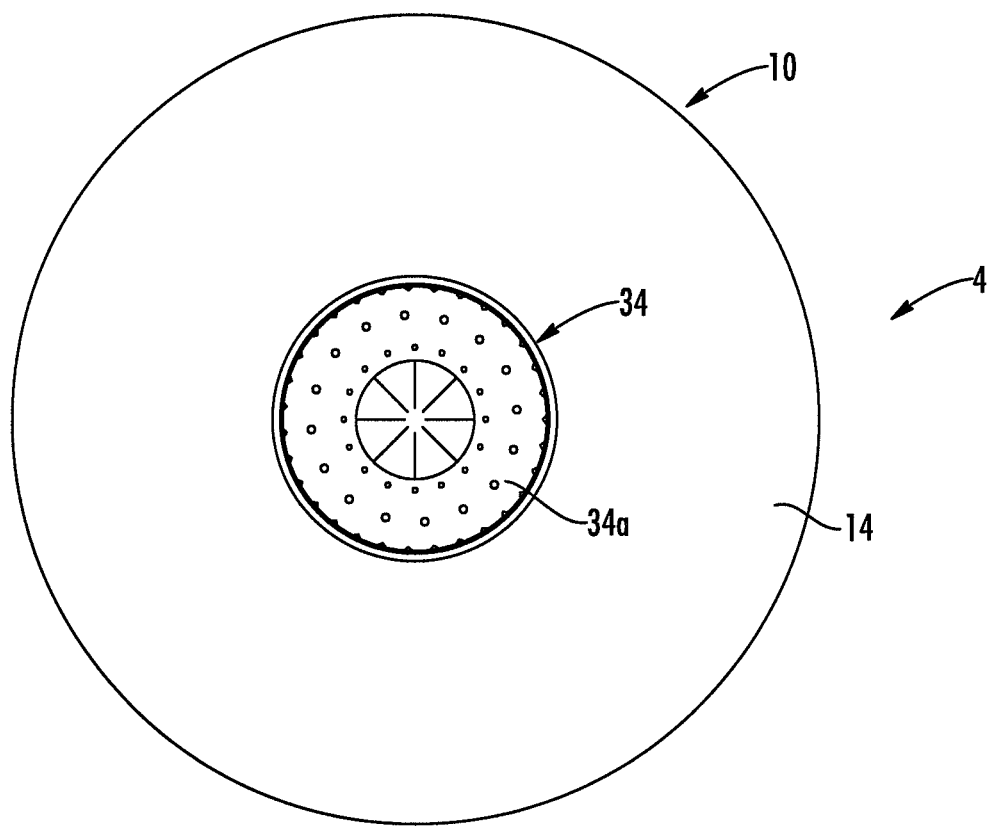
FIG. 3 is a top view of the luminaire of FIG. 1.
Figure 4:
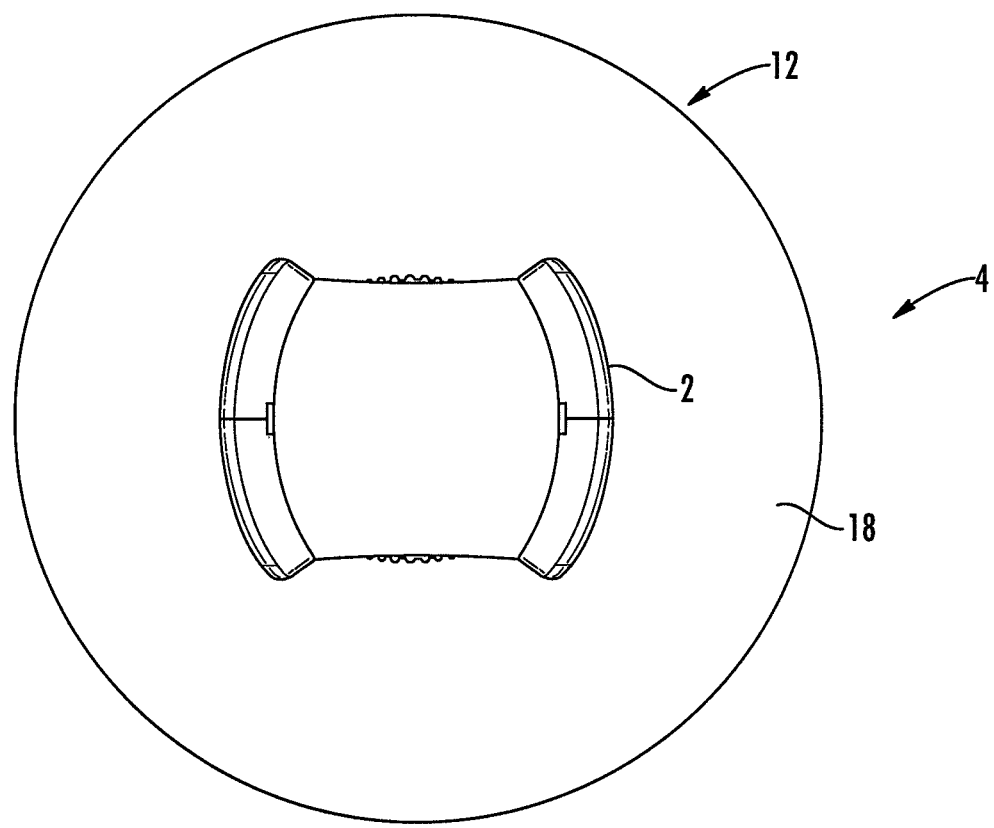
FIG. 4 is a bottom view of the luminaire of FIG. 1.

In one embodiment, the luminaire 1, as shown in FIGS. 1 and 2, is configured to provide controllable axial illumination in two directions A and B (e.g. uplight and downlight) along the longitudinal axis A-B of the luminaire. Uplight may be considered to be light directed generally vertically upwards and downlight may be considered to be light directed generally vertically downwards. While the luminaire of FIGS. 1 and 2 is configured to provide controllable axial uplight and downlight, the luminaire may be configured to direct axial light substantially horizontally or at any angle between vertical and horizontal. The luminaire comprises a support structure 2 for supporting the light emitting portion 4 of the luminaire in the desired position and orientation. In the illustrated embodiment the support structure 2 is vertically oriented and comprises a pair of towers 6 that define a horizontal base 6a that may support the luminaire on a floor, desk, table or other horizontal structure such that the light emitting portion 4 is spaced a suitable distance from the supporting horizontal structure. In one embodiment the support structure 2 and light emitting portion 4 are configured as a table lamp such that the luminaire has the general dimensions of a table lamp and may be supported on a table to provide general illumination. The support structure 2 may have virtually any configuration and dimensions and may comprise an ornamental design suitable for interior design and décor considerations other than that shown in the drawings.

While in the illustrated embodiment, the luminaire 1 is configured as a table or floor lamp, the support structure 2 may comprise any suitable supporting elements and may be used as other than a floor, desk or table lamp. For example, the support structure 2 may include a mounting structure such as brackets that may be configured to be secured to a wall or other structure, the support structure 2 may include a clamp to allow the luminaire to be releasably secured to a surface, the support structure 2 may include a cables or rods that allow the luminaire to be suspended from a ceiling, or the support structure 2 may have other suitable configurations.

The light emitting portion 4 of the luminaire comprises at least two waveguides arranged to emit light in two different primary axial directions. In the illustrated embodiment, waveguide 10 emits light in a first axial direction A that is primarily upwards and waveguide 12 emits light in a second axial direction B that is primarily downwards. The first waveguide 10 may comprise a primary light emitting surface 14 directed toward the first axial direction A and a secondary light emitting surface 16 facing the second axial direction B and disposed adjacent to the second waveguide 12. The second waveguide 12 may comprise a primary light emitting surface 18 directed toward the second direction B and a secondary light emitting surface 20 facing the first axial direction A and disposed adjacent to the secondary light emitting surface 16 of the first waveguide. In this manner the first waveguide 10 emits light primarily in the first axial direction A (upwardly) and the second waveguide 12 emits light primarily in the second axial direction B (downwardly). The waveguides 10, 12 may be constructed of a substantially transparent or translucent material such that the light emitting portion 4 is substantially transparent or translucent. In this configuration some light may exit the secondary light emitting surfaces 16, 20 of the waveguides 10, 12 such that the first waveguide 10 emits a small portion of light as downlight and the second waveguide 12 emits a small portion of light as uplight. Further, the illumination distribution may be visible through the waveguides along a line of sight extending along axis A-B. The optical waveguides 10, 12 exhibit a luminance from the secondary light emitting surfaces 16, 20 along the line of sight that is less than about 20%, preferably less than about 10%, and most preferably less than about 5% of the total luminance of the luminaire such that in some embodiments the primary light emitting surfaces emit at least 80% to at least 95% of the total luminance of the luminaire and in a preferred embodiment emit greater than about 95% of the total luminance of the luminaire.

Figure 10:
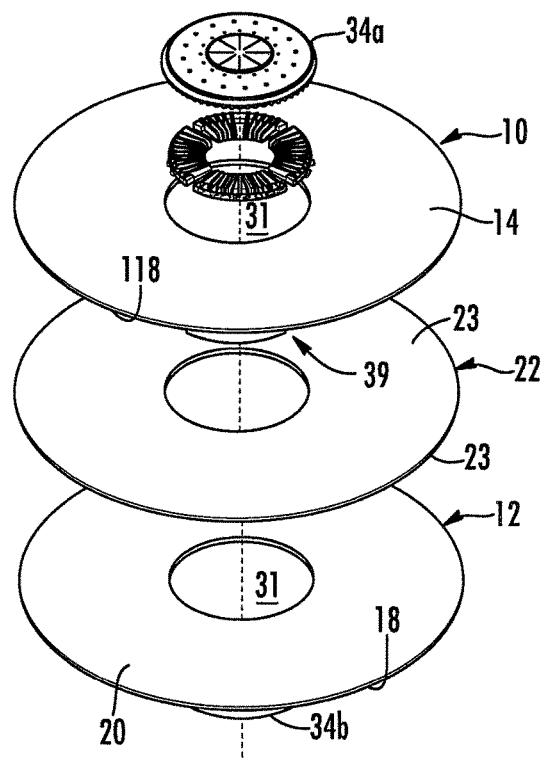
FIG. 10 is an exploded isometric view of an alternate embodiment of the waveguide assembly in the luminaire of FIG. 1.

In other embodiments a backplane 22 may be disposed between the waveguides 10, 12 such that the first waveguide 10 generates only light in direction A and the second waveguide 12 generates only light in direction B as shown in FIG. 10. The backplane 22 may comprise a part of the support structure 2 or may be separate therefrom. The backplane 22 may include surfaces 23 adjacent the secondary light emitting surfaces 16, 20 that has a white or specular reflective coating or other member secured or otherwise applied thereto. Light exiting the surfaces 16, 20 of the waveguides 10, 12 is reflected off the surfaces 23 and re-directed through the same waveguide so that the light contributes to the luminous intensity distribution of the light emitted from the primary light emitting surface of that waveguide. Each waveguide 10, 12 may comprise a separate backplane member or a single backplane member may be disposed between the waveguides. In some embodiments, a reflective or diffusive edge baffle may encircle the exterior edges of waveguides 10, 12 to prevent the appearance of a bright line pattern on an adjacent wall and to maximize waveguide extractor uniformity.

Figure 8:
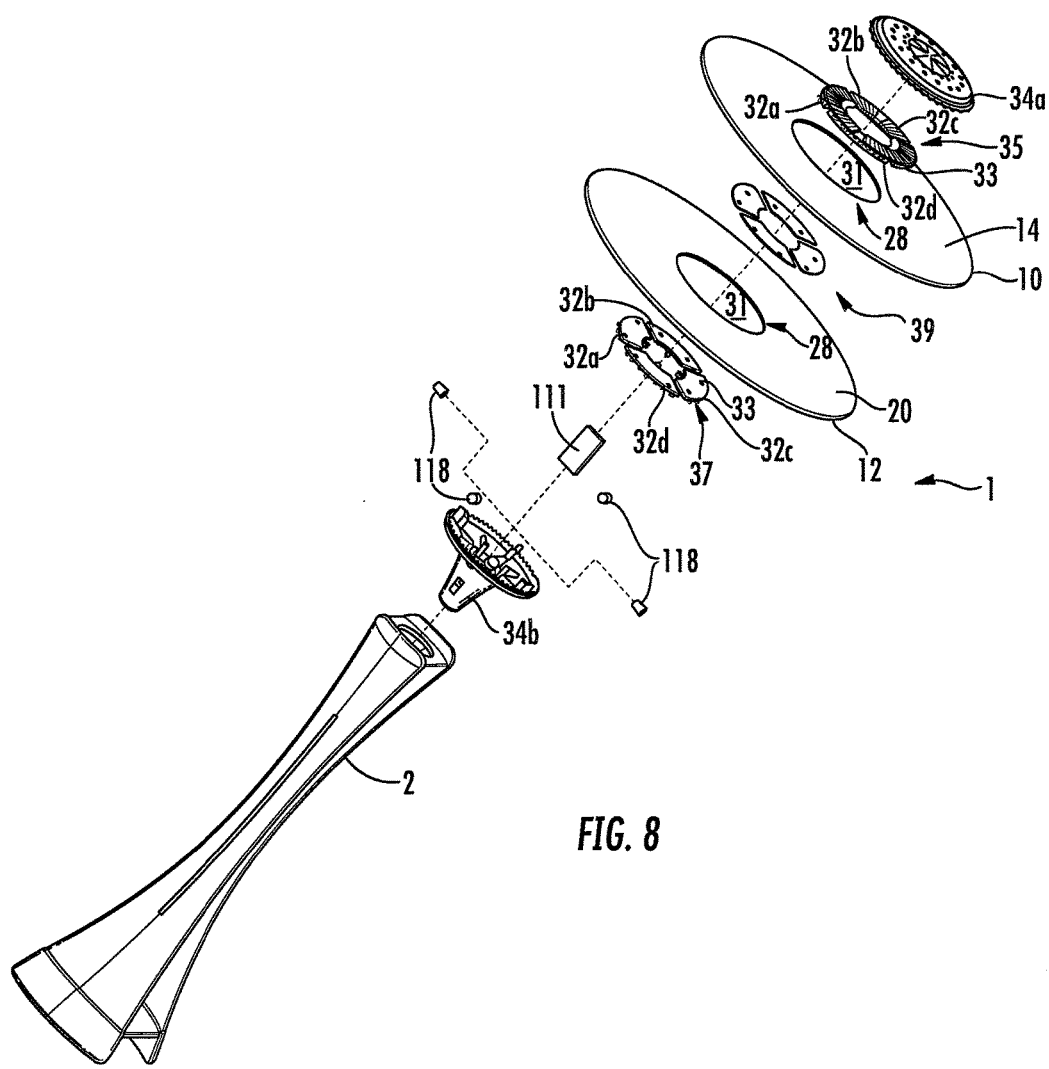
FIG. 8 is another exploded isometric view of the luminaire of FIG. 1.
Figure 11:
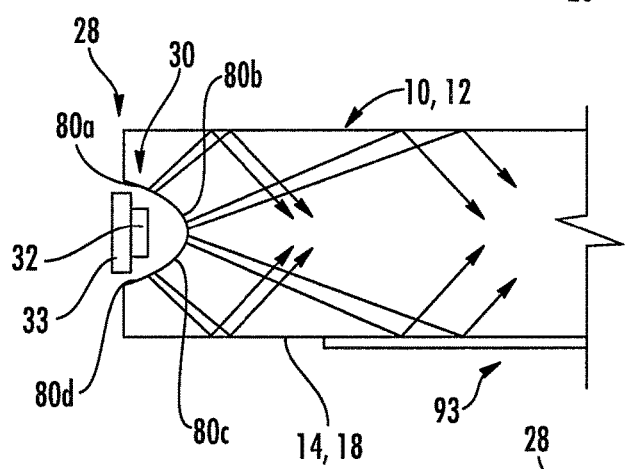
FIG. 11 is a partial schematic side view of a waveguide.
Figure 27:
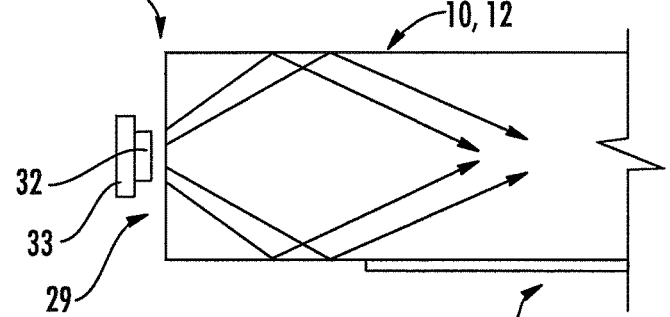
FIG. 27 is a partial schematic side view of a waveguide.

As shown in FIGS. 8, 11 and 27 each waveguide 10, 12 includes an input portion 28 having a light coupling feature for delivering the light emitted from the LEDs to the waveguide. The light coupling feature may comprise additional lenses, optics or the like. One or more LED elements or modules (hereinafter "LEDs") 32 are disposed in or adjacent the input portion 28 of each of the waveguides 10, 12 and direct the emitted light into the coupling feature 30. In one embodiment the light coupling feature is in the form of a cavity 30 for receiving light from the LEDs 32 and delivering the light to the waveguides 10, 12. The annular cavity 30 may be disposed at the inner edge of each of the waveguides 10, 12 such that the waveguides are edge-lit from the inner edge thereof. Where the light coupling feature 30 is a cavity, the cavity may be defined by a plurality of surfaces 80a, 80b, 80c, 80d. The surfaces 80 are designed to cause light developed by the one or more LEDs 32 disposed in or adjacent the light coupling feature 30 to be redirected into at least two groups or sets of light rays each of which travels within a range of ray angles through each waveguide or waveguide section. According to well-known TIR principles, the light rays of the groups continue to travel through the waveguides, respectively, until such rays strike an index interface surface at a particular angle less than an angle measured with respect to a line normal to the surface point at which the light ray is incident or, equivalently, until the light rays exceed an angle measured with respect to a line tangent to the surface point at which the light ray is incident, and the light rays escape. Other types of couplings and/or orientation of the LEDs 32 relative to the waveguides 10, 12 may be used. For example as shown in FIG. 27 the coupling feature at the input portion 28 of the waveguide may be a planar surface 29 that is disposed substantially perpendicularly to the LEDs 32. The coupling feature 29, 30 at the inner edges of the waveguides 10, 12 may be formed by apertures 31 formed substantially in the center of the waveguides although the aperture may be positioned off-center in the waveguides if desired. The type of coupling may influence the angular and spatial distribution of light within the waveguide, which in turn can influence the efficiency of extraction, the illuminance, and the luminance Each LED 32 may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED 32 may include one or more blue shifted yellow LEDs and one or more red LEDs. The LEDs may be disposed in different configurations and/or layouts as desired. Different color temperatures and appearances could be produced using other LED combinations, as is known in the art. In one embodiment, the LED 32 comprises, for example, an MT-G LED incorporating TrueWhite® LED technology developed and manufactured by Cree, Inc., the assignee of the present application, or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein in its entirety. If desirable, a side emitting LED may be utilized inside the waveguide body such as disclosed in U.S. Pat. No. 8,541,795, the disclosure of which is incorporated by reference herein in its entirety. Various types of LEDs may be used, including LED packages having primary optics as well as bare LED chips. The luminaire may include LEDs 32 of the same type of phosphor-converted white LED, or any combination of the same or different types of LEDs discussed herein. In some embodiments, a luminaire may include a plurality of groups of LEDs 32, where each group may include LEDs 32 having different colors and/or color temperatures. The groups of LEDs 32 may be separated by dividers, as described in U.S. patent application Ser. No. 14/472,035, filed Aug. 28, 2014, entitled "Luminaire Utilizing Multiple Edge Coupling" by Tarsa et al., which is incorporated by reference herein in its entirety, wherein the LEDs 32 are disposed within the coupling cavity. Such dividers facilitate the mixing of light between adjacent LEDs 32, limit the angle of incidence of light incident on the coupling surfaces of the waveguide, and reduce interaction and light absorption between LED components. In embodiments having LEDs of the same or similar color, dividers may not be necessary or desired. In any of the embodiments disclosed herein the LED element(s) or module(s) 32 may have a Lambertian or near-Lambertian light distribution, although each may have a directional emission distribution (e.g., a side emitting distribution), as necessary or desirable. More generally, any Lambertian, near-Lambertian, symmetric, wide angle, preferential-sided, or asymmetric beam pattern LED(s) may be used as the light source. The color, color temperature, brightness, CRI, and color gamut of the emitted light are referred to herein as the light properties of the emitted light and may be controlled by the user in addition to controlling the light emission pattern.

The LEDs may form part of LED assemblies 35 and 37 disposed adjacent the input portion 28 of the waveguides 10, 12, respectively. The LED assemblies 35, 37 may comprise an LED board 33 such as a PCB or a flexible PCB, such as a flex circuit, that supports a plurality of LEDs 32 arranged in a circular or cylindrical configuration such that light from the LEDs is directed into the light coupling feature 29, 30 of the waveguides 10, 12. The LED board 33 may physically support the LEDs and form part of the electrical path from the lamp electronics to the LEDs. The LED boards 33 may be mounted on heat sink structures 41 that may comprise heat dissipating elements such as fins for dissipating heat from the LEDs 32. The LEDs are arranged such that the LEDs of the first LED assembly 35 direct light into waveguide 10 and the LEDs of the second LED assembly 37 direct light into waveguide 12. The LEDs of the two LED assemblies 35, 37 are independently controllable such that the waveguides 10 and 12 may be independently illuminated. The LEDs of the two LED assemblies 35, 37 may be mounted on separate LED boards, as shown, or the two sets of LEDs may be mounted on a single LED board provided that the two sets of LEDs are independently controllable to illuminate the waveguides 10 and 12 independently of one another. As shown, the LED assemblies 35, 37 are disposed at the inner peripheral edges of the waveguides 10 and 12 such that light from the LEDs 32 is optically coupled to the waveguides at the inner edges thereof. Spacers 39 may be provided to isolate the LED assemblies 35, 37 from one another.

Figure 12:
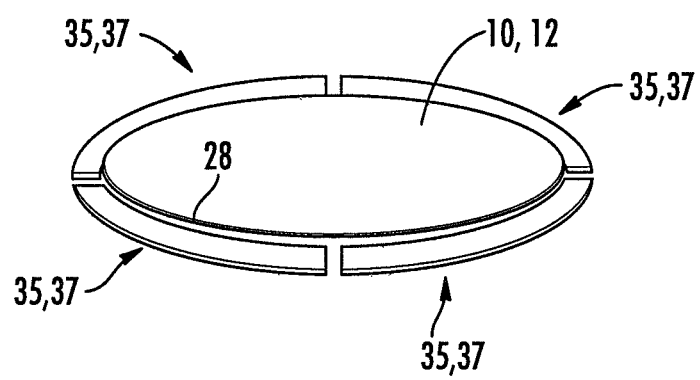
FIGS. 12-14 are isometric views of alternate embodiments of the waveguide.
Figure 13:
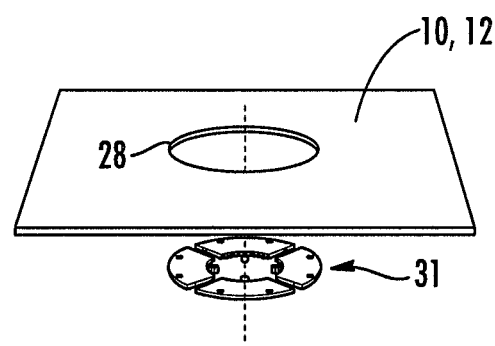
Figure 14:
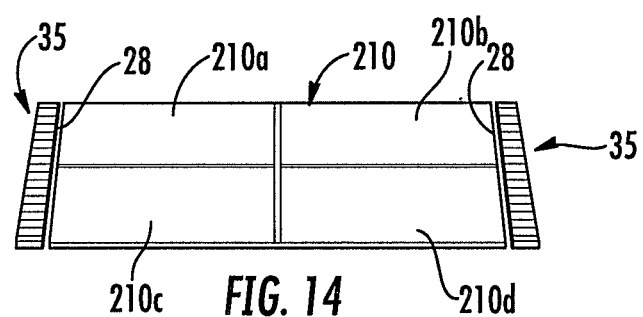

While the LED assemblies 35, 37 with LEDs 32 may be disposed at an input portion 28 of the waveguides 10, 12 that is positioned at an inner edge of the waveguides such that the LEDs direct light primarily outwardly as described above, the LED assemblies 35, 37 may be disposed at an input portion 28 of the waveguides that is positioned at an outside peripheral edge of the waveguide such that the LEDs direct light primarily inwardly as shown in FIG. 12. In such an embodiment apertures 31 may be eliminated. In the embodiments of FIGS. 1-12, the waveguides 10, 12 are generally circular in shape. However, in other embodiments the waveguides may have other shapes including, but not limited to, oval, rectangular (see FIGS. 13 and 14), polygonal or the like. Moreover, in some embodiments the shape of waveguide 10 may different that the shape of waveguide 12. In some embodiments the LED assemblies 35, 37 may be disposed along less than the entire peripheral edge of the waveguide. For example, as shown in FIG. 14 the LED assembly 35 associated with the waveguide 210 is disposed at two outer edges of the rectangular waveguide 210.

Referring to FIG. 1, the waveguides 10, 12 extend from a housing or enclosure 34 having a first part 34a and a second part 34b. The first and second parts 34a, 34b may be held together by fasteners (not shown), although any suitable fastening means may be used to trap the waveguides 10, 12 therebetween to support the waveguides relative to the support structure 2. The housing 34 also supports the LED assemblies 35, 37 and at least some of the control electronics for the luminaire. The support structure 2 may be physically connected to the enclosure 34 to support the waveguides in the desired position and orientation.

Referring to FIGS. 11, 27 and 15-18B, extraction features are disposed on the light emitting sides 14, 18 of the waveguides 10, 12. In some embodiments, the extraction features 93 are not visible to the viewers in the room. In other embodiments, the extraction features are arranged in a regular array such as a hexagonal close-packed array. In still other embodiments, the extraction features are arranged in a specific pattern (density pattern) in order to improve optical efficiency, luminance uniformity, or provide a desired visual effect. One or more extraction features 93 disposed on the primary light emitting surfaces 14, 18 cause the light to exit the waveguides 10, 12 in a controlled fashion such that light is directed out of the first and second primary light emitting surfaces. Because the light rays are at least substantially collimated they experience minimal spreading as they propagate through the waveguides. This results in highly controlled beams that can be either extracted in a collimated fashion, or spread into a wide distribution.

Figure 15:
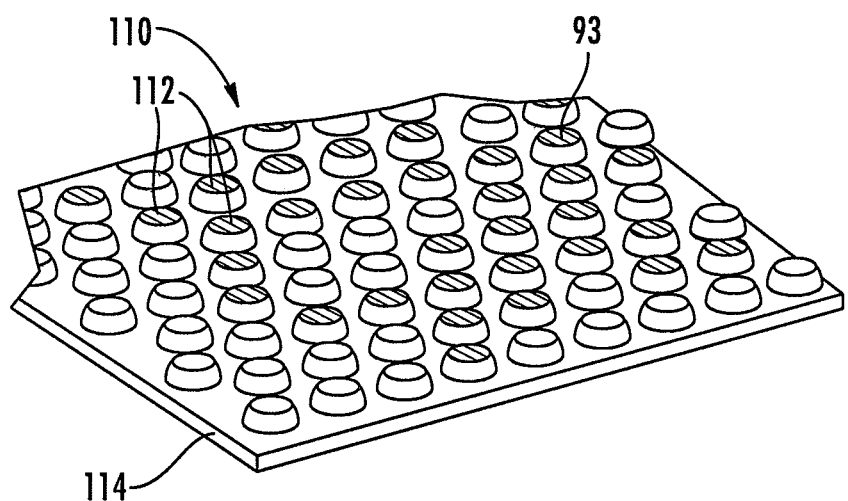
FIG. 15 is an isometric view of an embodiment of a the light extraction feature usable in the waveguides.

As shown in FIG. 15 the plurality of light extraction features 93 comprises an array 110 of regularly-spaced features 112, although it should be noted that the light extraction features may be irregularly spaced or some may be regularly spaced and others irregularly spaced, etc. In the illustrated embodiment, the light extraction features 93 are disposed in a hexagonal array and are disposed on a substrate 114, which may be a planar member, such as a film, a plate, a block or material, or the like. Further in the illustrated embodiment, the light extraction features 93 comprise protrusions carried by a film where the protrusions are disposed between the film and the primary light emitting surfaces 14, 18.

The substrate 114 having features 93 disposed thereon may be fabricated using one of a variety of techniques typically applied to the formation of micro-optical films, including gray-scale lithography, micro-replication, injection/compression molding, reactive ion etching, chemical embossing, or drum roll transfer. Other methods of fabrication include dispensing an acrylic-based UV resin or silicone material on a carrier film that is subsequently cured to form extraction features.

In some embodiments, the extraction features 93 may be disposed on the waveguides 10, 12 without a substrate 114. For example, the extraction features 93 may be fabricated directly on the surfaces 14, 18 of the waveguides 10, 12 by means of an intermediate patterning layer as described in U.S. Pat. No. 8,564,004, issued Oct. 22, 2013, entitled "Complex Primary Optics with Intermediate Elements" by Tarsa et al., incorporated by reference herein in its entirety. Using this method of manufacture, the extraction features 93 are optically joined to the waveguides 10, 12 without the need for the substrate 114. The patterning layer may be used with any method such as molding, injection molding, compression molding, dispensing, stencil printing, three-dimensional printing, photolithography, deposition, or the like. Specifically, the patterning layer is formed on the primary light emitting surfaces 14, 18 of the waveguides 10, 12 and includes holes or openings where the surface of the waveguide is exposed. The openings of the patterning layer correspond to locations where the extraction features are to be formed on the waveguide. In some embodiments, a mold is then placed over the patterning layer and the surfaces 14, 18 of the waveguides 10, 12. The mold includes voids that are aligned with the openings of the patterning layer to define cavities. The cavities are filled with the material of the extraction features to form the extraction features on the waveguides. In other embodiments, the material of the extraction features is applied to the openings of the patterning layer prior to placement of the mold on the patterning layer. In either case, the material of the extraction feature is then at least partially cured and the mold is removed. The material of the patterning layer may comprise polyvinyl alcohol, a poly(methyl methacrylate) (PMMA) one or more photoresist materials, or other suitable materials. The patterning layer may be removed by a water rinse, heat, vaporization, machining, developers and solvents, chemical etching/solvent, plasma etching, or any method that does not interfere with the material of the waveguides and/or extraction features. Alternatively, the waveguides 10, 12, the extraction features 93, and/or the substrate 114 may be bonded to one another through one or more supplemental layers such as an adhesive layer or pressure-sensitive adhesive film.

The light extraction features 93 may be of the same material as the substrate 114 and/or the waveguides 10, 12, or the materials of the features 93, the substrate 114, and/or the waveguides 10, 12 may be different. In any event, the material(s) of the features 93 and the substrate 114, as well as the waveguides 42, preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance. Preferably, although not necessarily, the features 93 are all solid or some or all have one or more voids or discrete bodies of differing materials therein. In some embodiments, the features 93 are preferably (although not necessarily) of substantially the same size (except, perhaps height extending from the substrate 114) and preferably (but not necessarily) have substantially the same shape, with minor variations in the shape utilized to produced specific luminous intensity patterns. In other embodiments, the size and shape of extractors vary significantly between waveguides or regions of waveguides to produce differing luminous intensity patterns. In still other embodiments, the symmetry or material of the extractors may vary in order to produce differing luminous intensity patterns.

Figure 16:
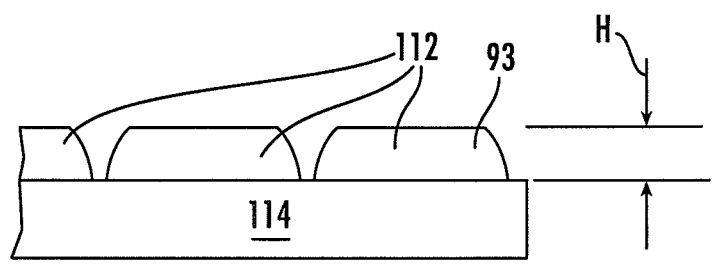
FIG. 16 is a side view of the light extraction feature of FIG. 15.
Figure 17A:
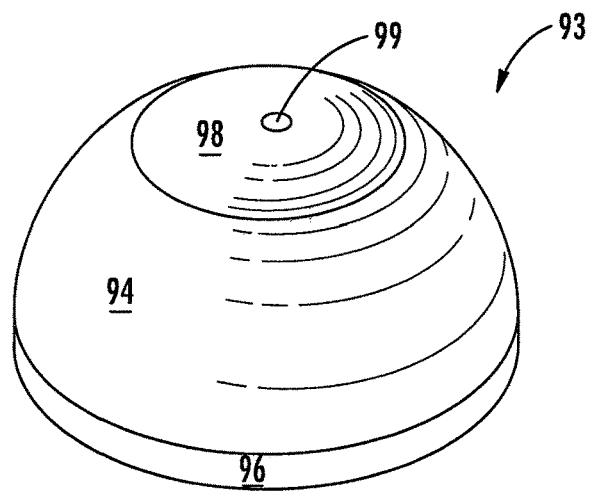
FIGS. 17A, 17B and 17C are isometric, side and end views of an alternate light extraction feature usable in the waveguides.
Figure 17B:
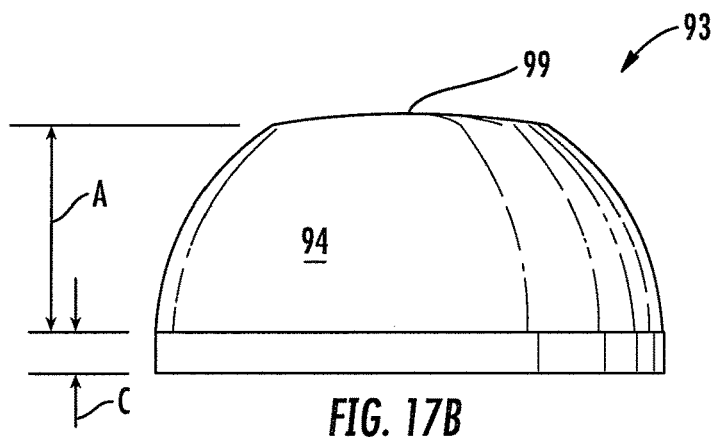
Figure 17C:
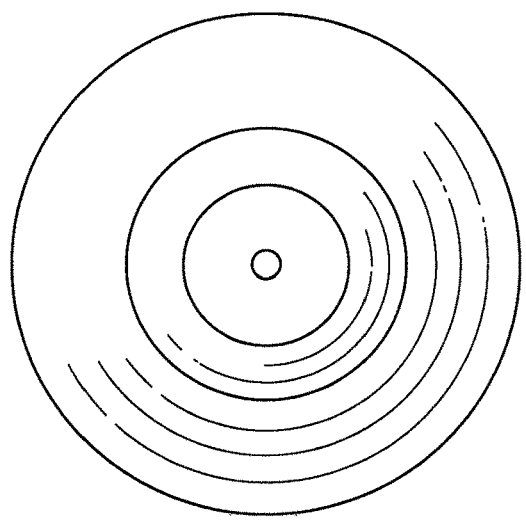

The illuminance distributions of the waveguides 10, 12 are dependent upon the particular geometry and arrangement of extraction features 93. The features 93 may preferably have a truncated hemispherical shape as shown in FIGS. 15 and 16, although other shapes are possible. Another geometry which is particularly useful for a range of lighting applications, includes a roughly "bullet shaped" profile as illustrated in FIGS. 17A-17C, consisting of a truncated curved surface 94 such as a truncated hemisphere with an adjacent cylindrical or conical base 96. This particular geometry provides a high degree of directionality as well as a range of possible illuminance distributions that may be realized by changing the height at which the curved surface is truncated. The high directionality (i.e., ratio of 'downward' emitted light to 'upward' emitted light) can help minimize efficiency loss by minimizing reflections off of a backplane reflective member 22 or eliminate the need for the reflective backplane member altogether, thereby reducing system cost. The height A of the hemispherical portion 94 affects the distribution of the light illumination of each waveguide 10, 12 while the height C of the base 96 affects predominantly the percentage of light emitted downwardly relative to upward emitted light. If desired, a bonding feature 98 having a central planar portion 99 may be formed atop the truncated hemispherical portion 94. In some embodiments, the bonding feature 98 facilitates fabrication by enabling the bond between the feature 93 and the waveguide surfaces to be free of air pocket(s) that may otherwise form. In general, the bonding feature 98 of each extraction feature is bonded, laminated, or otherwise optically coupled to the primary light emitting surfaces such that the bonding feature 98 is embedded in the interposing adhering layer and results in a planar bond between the extraction feature 93 and the waveguide surfaces.

Figure 18A:
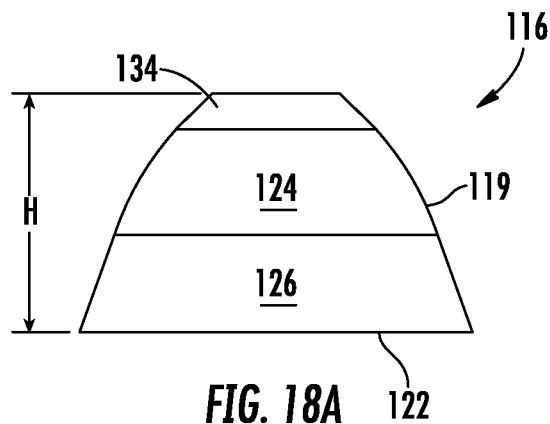
FIGS. 18A and 18B side and end views of another alternate light extraction feature usable in the waveguides.
Figure 18B:
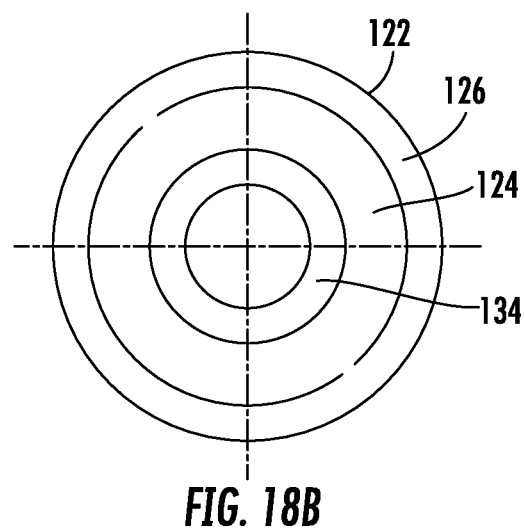
Figure 19:
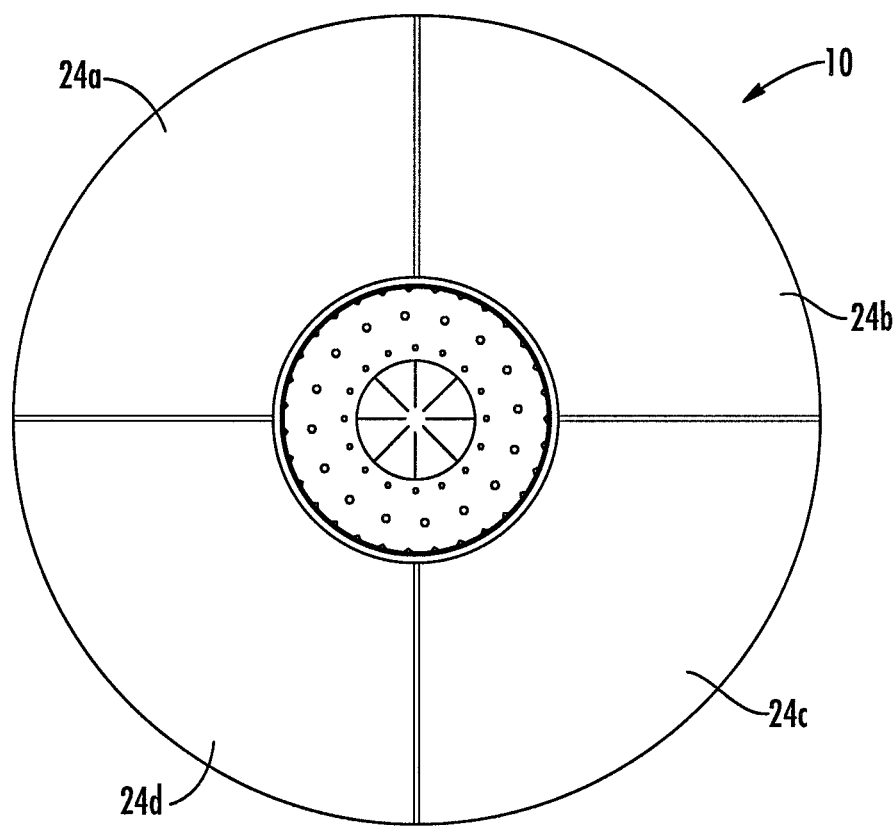
FIG. 19 is a top view of another embodiment of a luminaire.
Figure 20:
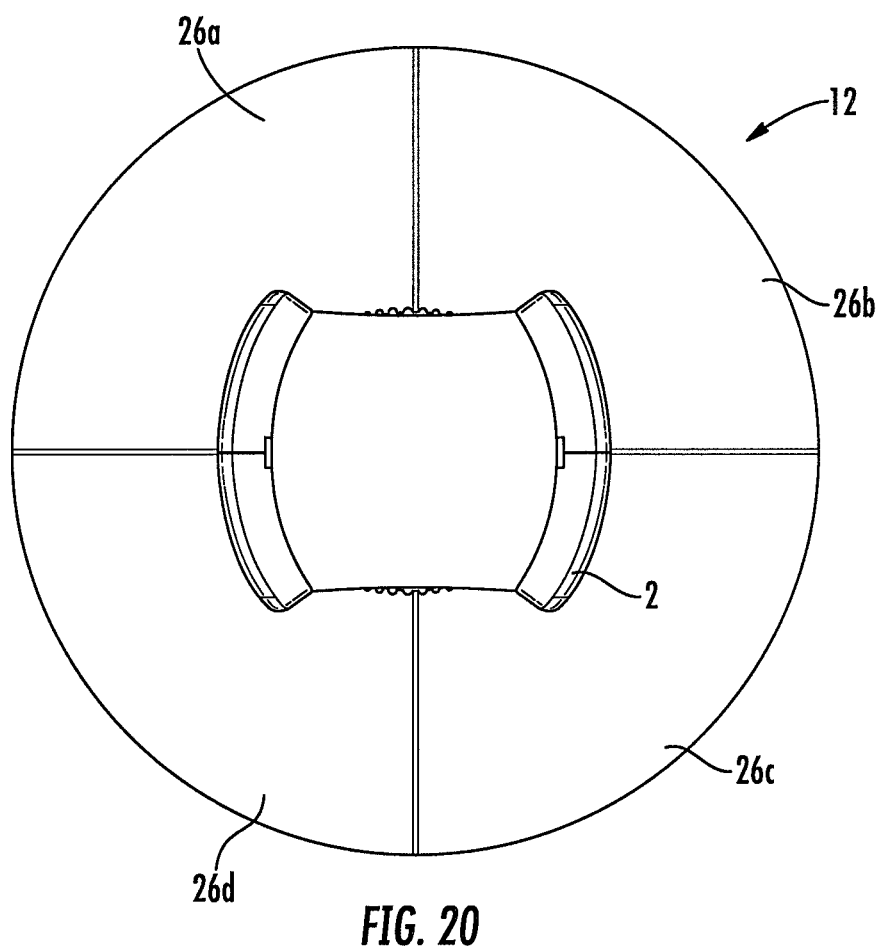
FIG. 20 is a bottom view of the luminaire of FIG. 19.

Further example extraction features 116 are illustrated in FIGS. 18A and 18B. Each extraction feature 116 includes a body 119 having a curved shape that extends between an aperture 120 adjacent the surfaces of the waveguides 10, 12 and a base 122 opposite the bonding feature 134. The body 118 may include planar surfaces, curved surfaces, planar surfaces approximating a curve, or a combination thereof. The cross sectional outer profile of the body 118 may be symmetric in nature (e.g., as in the case of a hemisphere) or asymmetric (e.g., as in the case of an ellipse or other combination of shapes). The extraction features 116 and/or waveguides 10, 12 may be acrylic, including an acrylic UV-curable resin, silicone, polycarbonate, glass, or other suitable material(s) and combinations thereof, possibly in a layered arrangement, to achieve a desired effect. The body 118 may include a first portion 124 adjacent the bonding feature 134 and a second conical portion 126 adjacent the base 122. In some embodiments, the first portion 124 may be designed to redirect incident light downward through total internal reflection (TIR). In still further embodiments, the extraction features 116 may have an asymmetric shape. For example, the first portion 124 of the extraction feature 116 may be hemispherical and the base 122 may be elliptical such that the feature 116 appears as a truncated hemisphere when viewed from any cross-section, but appears as an ellipse or elongated circle when viewed from the top or bottom. Such asymmetric geometry would result in an asymmetric illuminance pattern such that may be desired for certain applications. Further, the extraction features 93, 116 having an asymmetric cross-section along the height H may direct light into particular directions or quadrants below the luminaire. Extraction features 93, 116 with segmented cross-sections and top or bottom profiles consisting of a combination of curved surfaces and linear surfaces (such as an extractor that appears as a truncated hemisphere from the side, but appears as a star-shape or faceted shape from above) may be used for specific lighting applications requiring a very unique and defined illuminance distribution (e.g., stage lighting, architectural or cove lighting). Still further, extraction features having a generally conic shape (symmetric or asymmetric, truncated or not) may produce more collimated light beams in specific directions (e.g., for direct/ indirect pendant lighting, downlighting, etc.). The shape of the extraction features may be determined as set forth in U.S. patent application Ser. No. 14/472,064, filed Aug. 28, 2014, entitled "Luminaire with Selectable Luminous Intensity Pattern" by van de Ven et al., which is incorporated by reference herein in its entirety.

Figure 9:
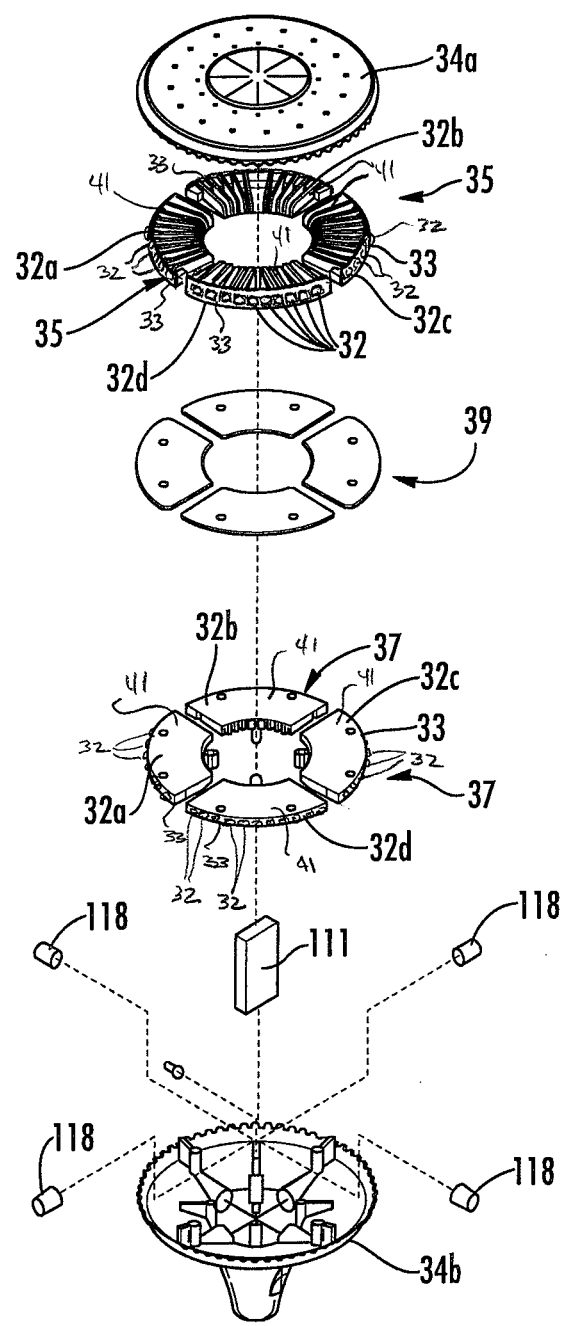
FIG. 9 is an exploded isometric view of the LED assemblies in the luminaire of FIG. 1.

Referring to FIG. 9, for example, the LEDs 32 may be arranged to divide the light emitting portion 4 into sections such that the light emission pattern of the lamp may be controlled laterally as well as axially. The LEDs 32 in each of LED assemblies 35 and 37 are arranged in a plurality of LED groups 32a, 32b, 32c, 32d where the light emitted by the LEDs in each of the LED groups may be controlled independently of the LEDs in the other LED groups. In the illustrated embodiments the LED board 33 and heat sinks 41 are divided into separate elements, one associated with each of the LED groups; however, a single LED board and a single heat sink structure may be used provided the LED groups are independently controllable. By selectively controlling the light emitted by the LEDs in each LED group 32a, 32b, 32c, 32d of LED assemblies 35 and 37 the lateral distribution of the light may be controlled. For example if all of the LED groups 32a, 32b, 32c, 32d are illuminated the luminaire emits light omni-directionally such that the light is emitted in 360 degrees about the axis of the lamp. If two adjacent LED groups 32a, 32b of the luminaire are illuminated the luminaire emits light directionally where light is emitted primarily to the side of the luminaire on which the LED groups are illuminated and substantially less light is emitted to the side of the luminaire where the non-illuminated LED groups are directed. The LED groups may also be illuminated in other patterns such as illuminating fewer than half of the LED groups, illuminating more than half of the LED groups, alternating illuminated LED groups with non-illuminated LED groups or the like to create different light emission patterns and effects. Moreover, while four LED groups 32a, 32b, 32c, 32d are shown a greater or fewer number of LED groups may be provided. The more LED groups that are provided, the more fine the control over the light pattern. Also, the LED groups may be illuminated at different power levels and/or with different light properties to further vary the light emission pattern.

The multiple LED groups 32a, 32b, 32c, 32d may be used with monolithic waveguides 10, 12, shown in FIGS. 1-14 where the pattern of the light emitted by each waveguide is controlled by selective activation of the LED groups 32a, 32b, 32c, 32d associated with that waveguide. It will be appreciated that in such an embodiment as the light fans out from the LEDs 32 some of the light may be transmitted across and be emitted from the waveguide at locations laterally spaced from the activated LEDs. The emitted light will be brightest in the portions of the waveguide into which the activated LEDs are directed and the emitted light will diminish in intensity in areas of the waveguide that are optically spaced from the activated LED groups. Thus, referring to FIG. 8, if the two LED groups 32a, 32b are illuminated and two LED groups 32c, 32d are not illuminated the majority of the light will be emitted from the waveguides in the area of the waveguides 10, 12 that directly receive the light emitted from the illuminated LED groups 32a, 32b (the area to the left of the broken line in FIG. 8) while less of the light will be emitted from areas of the waveguides optically spaced from the illuminated LED groups (the area to the right of the broken line in FIG. 8). The intensity of the emitted light will gradually diminish across the waveguides from the directly illuminated areas of the waveguides to the non-directly illuminated areas of the waveguides. Thus, while a laterally directional light emission pattern is developed where half of the waveguides are directly illuminated, at least some light may be transmitted through the remainder of the waveguides and be emitted from the non-directly illuminated areas such that the transition between the directly illuminated part of the waveguides and the non-directly illuminated part of the waveguides will be gradual.

In some embodiments, in addition to arranging the LEDs as independently controllable LED groups, each of the waveguides 10, 12 may be divided into sections that provide further additional control over the light emission pattern. As shown in FIGS. 19-22 the first waveguide 10 may comprise multiple waveguide sections 24a, 24b, 24c and 24d that are arranged in a side-by-side substantially coplanar array where each waveguide section is disposed adjacent at least one other waveguide section. Likewise, the second waveguide 12 may comprise multiple waveguide sections 26a, 26b, 26c and 26d that are arranged in a side-by-side substantially coplanar array wherein each waveguide section is disposed adjacent at least one other waveguide section. If desired, optional optical isolation members in the form of reflective barriers 28 may be disposed between some or all of the adjacent waveguide sections. Each reflective barrier 28 may comprise a specular or white reflective member or film that extends partially or completely between adjacent waveguide sections 24a-24d, 26a-26d so that the adjacent waveguides are partially or fully optically isolated, respectively, with respect to one another. In some embodiments the separate waveguide sections may be formed by physically separate parts as shown in FIGS. 19-22. In other embodiments, a single part may form the waveguide where the waveguide sections are optically separated from one another such as by providing optical barriers between the sections as shown in FIG. 23. The optical barriers may be gaps 27 formed between the primary light emitting surfaces of the waveguide sections as shown in FIG. 23. In other embodiments, the optical barriers may comprise reflective barriers 28 that may be, for example, insert molded between the waveguide sections during manufacture of the waveguides. Other mechanisms for optically separating the waveguide sections may be used.

In the illustrated embodiment, the waveguides 10, 12 are generally circular in shape. In such an embodiment, if waveguide sections are provided each waveguide section may be formed essentially as a sector of a circle as shown in FIGS. 19-22. However, in other embodiments the waveguides may have other shapes including, but not limited to, oval, rectangular (see FIGS. 13 and 14), polygonal or the like and the waveguide sections may have shapes other than the sector shaped sections selected to create the waveguide and to generate a desired light emission profile, an example of such sections 210a-210d are shown in FIG. 14. Moreover, while in the illustrated embodiments each waveguide 10, 12 is shown made up of four waveguide sections a fewer or greater number of waveguide sections may be used to create each waveguide. Each waveguide 10, 12 and waveguide section may have any suitable shape, and the shapes of the waveguides and waveguide sections may be different from one another or substantially identical. Moreover, the light emitting elements formed on each of the primary light emitting surfaces of the waveguide sections may be different, as previously described, such that each waveguide section may have a different light emission pattern than other ones of the waveguide sections of the same waveguide.

Figure 22:
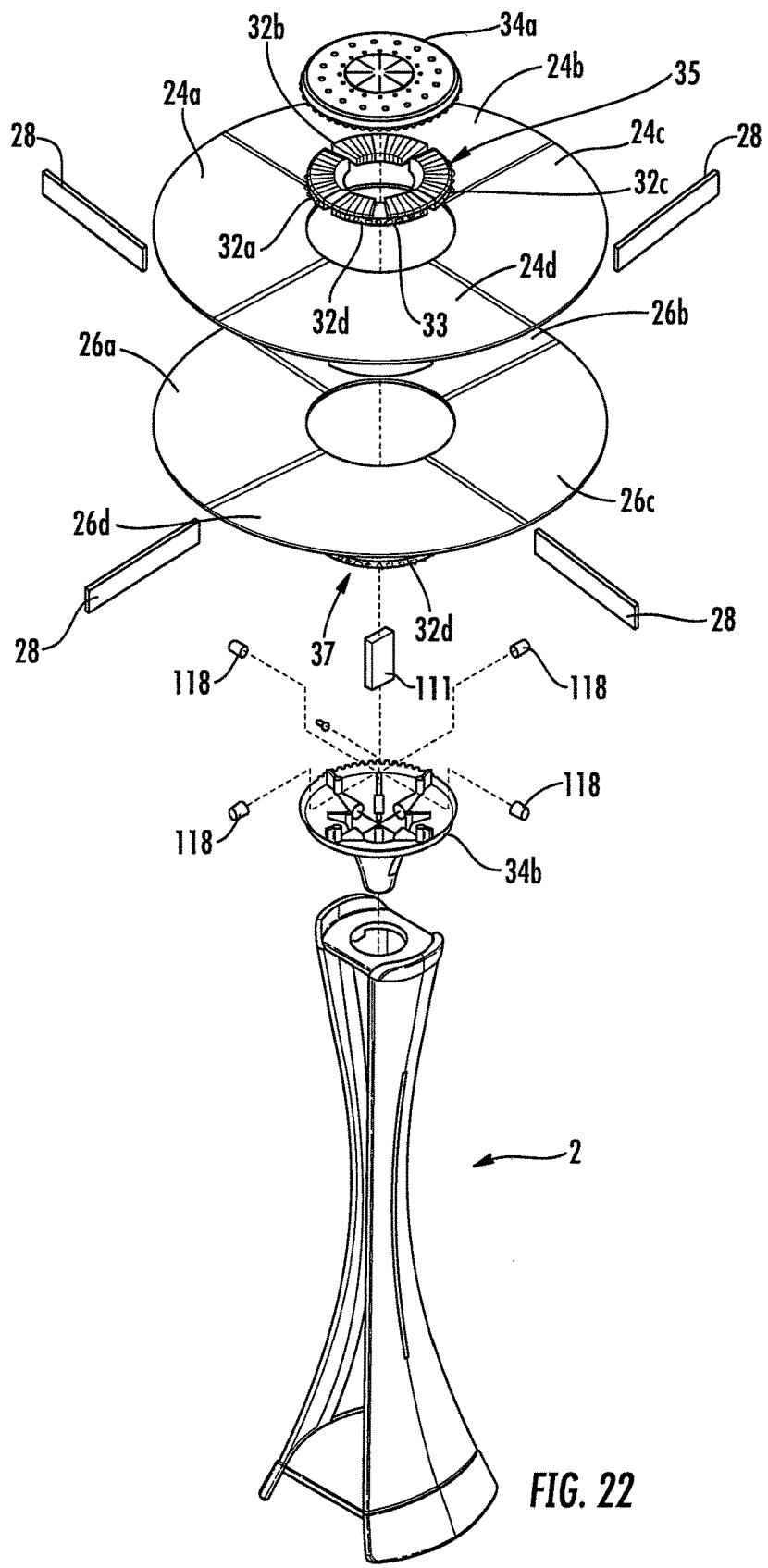
FIG. 22 is an exploded isometric view of the luminaire of FIG. 19
Figure 23:
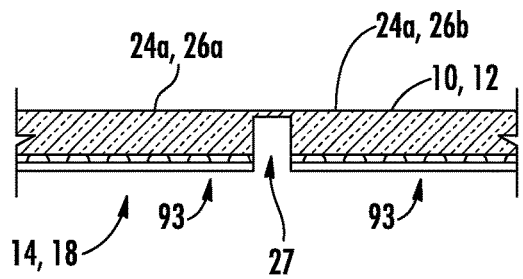
FIG. 23 is a partial schematic side view of a waveguide.

As shown in FIG. 22 each of the waveguides 10, 12 may comprise a plurality of optically decoupled waveguide sections 24*a*, 24*b*, 24*c*, 24*d* and 26*a*, 26*b*, 26*c*, 26*d*, respectively. One of each of the waveguide sections of waveguide 10 may be optically coupled to one of LED groups 32*a*-32*d* of LED assembly 35 such that the light emitted by each one of the LED groups is emitted from the waveguide 10 only via the waveguide section optically coupled to that LED group. Likewise, one of each of the waveguide sections of waveguide 12 may be optically coupled to one of LED groups 32*a*-32*d* of LED assembly 37 such that the light emitted by each one of the LED groups is emitted from the waveguide 12 only via the waveguide section optically coupled to that LED group. The waveguide sections may be in a one-to-one relationship with the LED groups or each waveguide section may be optically coupled to more than one LED group. As previously described, each waveguide 10, 12 may comprise multiple waveguide sections that are maintained in a side-by-side array wherein each waveguide section is disposed adjacent at least one other waveguide section. The light emitted by each LED group is transmitted to the waveguide section that is optically coupled to that LED group such that light generated by that LED group is substantially only emitted from the associated waveguide section. Such an arrangement may be used to provide sharper delineation between the light emitted from one waveguide section of the waveguide and the light emitted from a different waveguide section of the waveguide as compared to the more gradual transition described above with respect to FIGS. 1-11.

Moreover, different waveguide sections of the waveguides 10, 12 may be provided with different light extracting properties such that light emitted from one section of the wave guide has a different emission pattern than light emitted from another section of the waveguide. Where the waveguide is divided into sections each section may be easily provided with different light extracting properties. However, each section of the waveguide may be provided with different light extraction properties even where a single waveguide is used as shown in FIG. 23. Because each of the LEDs associated with each of the waveguide sections is independently controllable and dimmable the luminaire may produce a variety of light emission patterns.

Figure 24A:
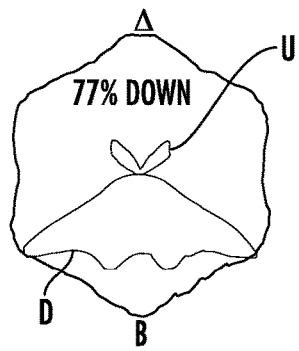
Figure 24B:
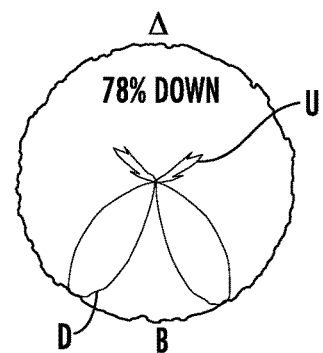
Figure 24C:
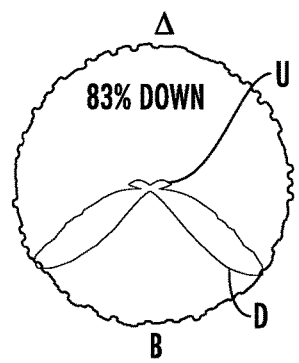

In the illustrated embodiment the primary light emitting surfaces 14, 18 of the waveguides 10, 12 are disposed horizontally to emit light primarily upwardly and downwardly respectively. The axis A-B along which the primary light emitting surfaces emit light may be considered the axial orientation of the luminaire where as illustrated the axial orientation is vertical. It will be appreciated that a luminaire may be configured where the axial orientation is horizontal or at any angular location between vertical and horizontal. Moreover, in some luminaires the axial orientation of the waveguides may be adjustable relative to the support structure 2 such that the axial orientation may be changed during use of the luminaire. For example, the light emitting portion 4 of the luminaire may be rotatably or tiltably mounted on support structure 2. The light intensity extends in both directions along the axial orientation and may be independently adjusted in both directions. It is to be understood that the light emitted from the waveguides may be emitted in a variety of light emission patterns such that light is not directed solely along the axis but may be emitted directionally, in a Lambertian pattern or in any other desired pattern where a portion of the light may be emitted in directions at angles to the axis of orientation. FIG. 24A shows an illumination pattern for a luminaire as shown in FIG. 1 where 77% of the emitted light is emitted as downlight D and 23% of the emitted light is emitted as uplight U where the emission is laterally symmetrical; FIG. 24B shows an illumination pattern for a luminaire as shown in FIG. 1 where 78% of the emitted light is emitted as downlight D and 22% of the emitted light is emitted as uplight U where the emission is laterally symmetrical; FIG. 24C shows an illumination pattern for a luminaire as shown in FIG. 1 where 83% of the emitted light is emitted as downlight D and 17% of the emitted light is emitted as uplight U where the emission is laterally symmetrical. While the percentage of emitted uplight and downlight is similar for the three examples, the difference in illumination patterns is caused by the type of light emitting elements formed on the waveguides. In the embodiment of FIG. 24A the light emitting elements are truncated hemispheres, in the embodiment of FIG. 24B the light emitting elements are conical; and in the embodiment of FIG. 24C the light emitting elements are torroidal. The actual illumination patterns may be different than those illustrated and the specific shape and intensity of the illumination patterns may vary widely from those shown. Moreover, the amount of light emitted by each of waveguides 10 and 12 may be increased and/or decreased such that the uplight may be greater than the downlight, the downlight may be greater than the uplight or the light emitted as uplight and downlight may be substantially equal. Additionally, the illumination patterns for the uplight and the downlight may be different from one another. Thus, by selectively and controllably illuminating the waveguides 10, 12 the illumination pattern may be varied along the orientation axis A-B.

Figure 25:
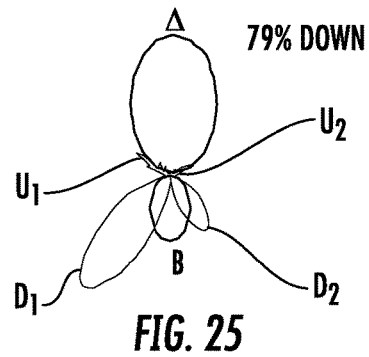

FIG. 25 shows an illumination pattern for a luminaire as shown in FIG. 1 where 79% of the light is emitted as downlight and where the light is emitted in a laterally asymmetric pattern such that more light $U_1$, $D_1$ is emitted to one side of the luminaire (left as viewed in FIG. 25) and relatively less light $U_2$, $D_2$ is emitted to the opposite side of the luminaire (right as viewed in FIG. 25). In the embodiment of FIG. 25, for example, two adjacent waveguide sections of each of waveguides 10 and 12 are illuminated more and the other two adjacent waveguide sections are illuminated less. This type of illumination pattern may be useful if the luminaire is positioned adjacent a wall or in other situations where laterally directional lighting is desired.

Figure 26:
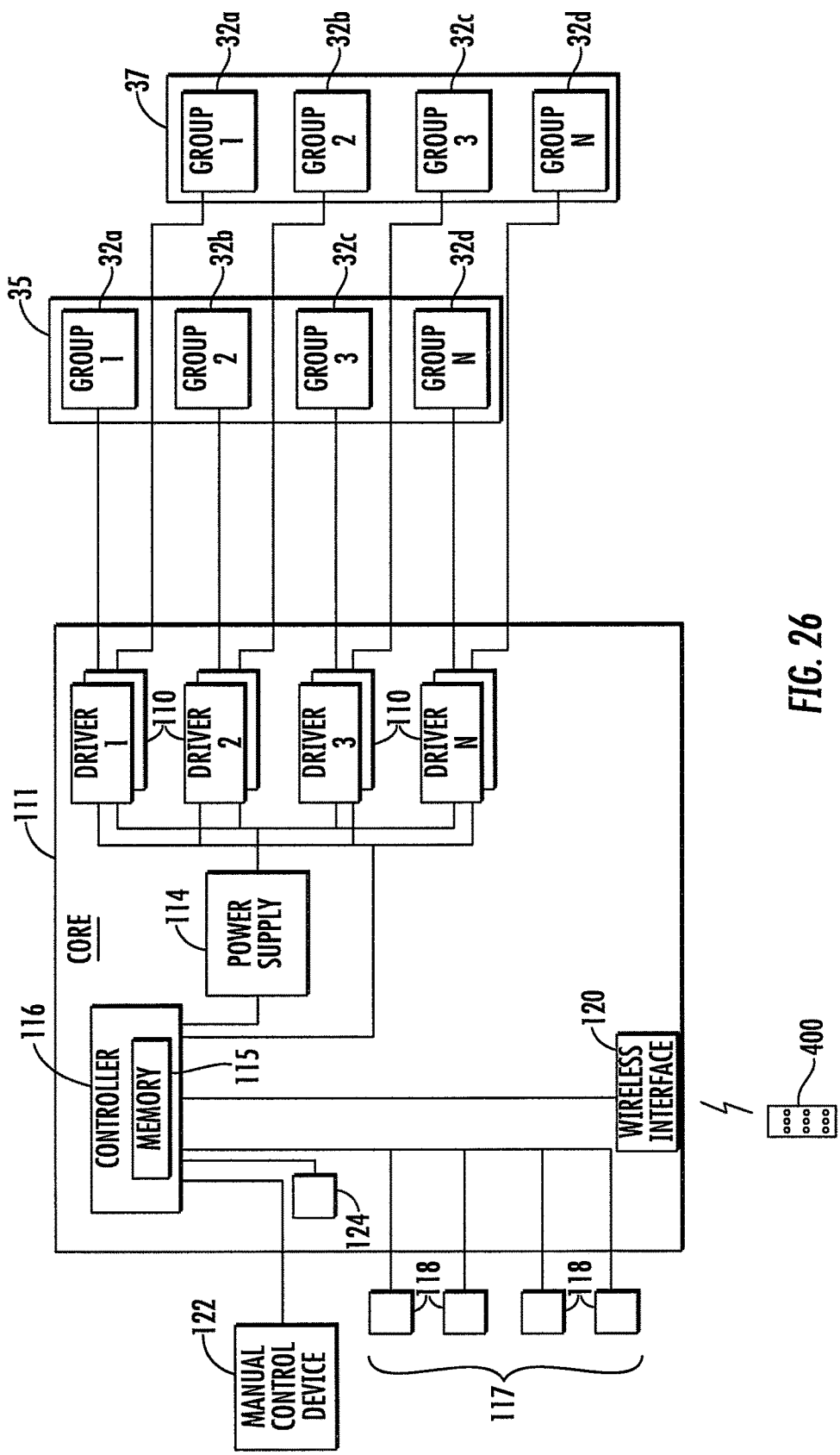
FIG. 26 is a block diagram of an embodiment of the control system of the luminaire of the invention.

The architecture of the luminaire may comprise a core 111 comprising the controller, LED drivers, ambient light sensors and Bluetooth LE. The core may also comprise a power supply such as a 24V AC/DC power supply with 5V regulator. The drivers control operation of the LEDs. The core may be sized and configured to be positioned at the center of the waveguide structure. The core communicates with the PIR sensors and manual sensor described above to control the operation of the LEDs. Referring to FIG. 26, the control architecture for the luminaire includes drivers 110 for operating the LED groups 32*a*-32*d* of each of LED assemblies 35 and 37. The drivers 110 may comprise buck converters controlled by two 16 bit PWM for controlling dimming of the LEDs. The luminaire electronics may further comprise a power supply 114 comprising a buck regulator. A controller 116, that in some embodiments comprises a microprocessor, controls the power supply 114 and drivers 110 in accordance with control signals received from passive infrared (PIR) sensors 118, manual control device inputs 122 and/or wireless signals received from wireless interface 120 such as based on Bluetooth technology. Controlling the LEDs allows the LED groups 32*a*-32*d* associated with each of the waveguides 10 and 12 and/or waveguide sections 24*a*-24*d* and 26*a*-26*d* to be independently controlled to control the emission pattern of the light as uplight, downlight and lateral light. Any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. which is incorporated by reference herein in its entirety or U.S. Pat. No. 9,303,823, issued Apr. 5, 2015, entitled "SEPIC Driver Circuit with Low Input Current Ripple" by Hu et al. which is incorporated by reference herein in its entirety. The circuit may further be used with light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. which is incorporated by reference herein in its entirety.

Further, any of the embodiments disclosed herein may include one or more communication components forming a part of the light control circuitry, where the wireless interface 120 may comprise an RF antenna that senses RF energy. The communication components may be included, for example, to allow the luminaire to communicate with other luminaires and/or with an external wireless controller, such as disclosed in U.S. Pat. No. 8,975,827, issued Mar. 10, 2015, entitled "Lighting Fixture for Distributed Control" which is incorporated by reference herein in its entirety or U.S. patent application Ser. No. 14/498,119, filed Sep. 26, 2014, entitled "Handheld Device that is Capable of Interacting with a Lighting Fixture", U.S. patent application Ser. No. 14/498,147, filed Sep. 26, 2014, entitled "Enhanced Lighting Fixture", U.S. patent application Ser. No. 14/498,168, filed Sep. 26, 2014, entitled "Handheld Device for Grouping a Plurality of Lighting Fixtures", U.S. patent application Ser. No. 14/498,197, filed Sep. 26, 2014, entitled "Handheld Device for Merging Groups of Lighting Fixtures", U.S. patent application Ser. No. 14/498,219, filed Sep. 26, 2014, entitled "Handheld Device for Controlling Settings of a Lighting Fixture", U.S. patent application Ser. No. 14/588,762, filed Jan. 2, 2015, entitled "Power Over Ethernet Lighting Fixture", U.S. patent application Ser. No. 14/725,687, filed May 29, 2015, entitled "Power Over Ethernet Lighting Fixture", all of which are incorporated by reference herein in their entirety. More generally, the control circuitry includes at least one of a network component, an RF component, a control component, and a sensor. The sensor may provide an indication of ambient lighting levels thereto and/or occupancy within the room or illuminated area. Such sensor may be integrated into the light control circuitry. In various embodiments described herein various smart technologies may be incorporated in the luminaires as described in the following applications "Solid State Lighting Switches and Fixtures Providing Selectively Linked Dimming and Color Control and Methods of Operating," U.S. Pat. No. 8,736,186, issued May 27, 2014, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," U.S. Pat. No. 9,155,165, issued Oct. 6, 2015, which is incorporated by reference herein in its entirety; "Multi-Agent Intelligent Lighting System," U.S. Pat. No. 8,975,827, issued Mar. 10, 2015, which is incorporated by reference herein in its entirety; "Routing Table Improvements for Wireless Lighting Networks," U.S. Pat. No. 9,155,166, issued Oct. 6, 2015, which is incorporated by reference herein in its entirety; "Commissioning Device for Multi-Node Sensor and Control Networks," U.S. Pat. No. 9,433,061, issued Aug. 30, 2016, which is incorporated by reference herein in its entirety; "Wireless Network Initialization for Lighting Systems," U.S. Pat. No. 8,829,821, issued Sep. 9, 2014, which is incorporated by reference herein in its entirety; "Commissioning for a Lighting Network," U.S. Pat. No. 8,912,735, issued Dec. 16, 2014, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; "Handheld Device that is Capable of Interacting with a Lighting Fixture," U.S. patent application Ser. No. 14/498,119, filed Sep. 26, 2014, which is incorporated by reference herein in its entirety; "Enhanced Lighting Fixture," U.S. patent application Ser. No. 14/498,147, filed Sep. 26, 2014, which is incorporated by reference herein in its entirety; "Handheld Device for Grouping a Plurality of Lighting Fixtures," U.S. patent application Ser. No. 14/498,168, filed Sep. 26, 2014, which is incorporated by reference herein in its entirety; "Handheld Device for Merging Groups of Lighting Fixtures," U.S. patent application Ser. No. 14/498,197, filed Sep. 26, 2014, which is incorporated by reference herein in its entirety; "Handheld Device for Controlling Settings of a Lighting Fixture," U.S. patent application Ser. No. 14/498,219, filed Sep. 26, 2014, which is incorporated by reference herein in its entirety; "Power Over Ethernet Lighting Fixture", U.S. patent application Ser. No. 14/588,762, filed Jan. 2, 2015, which is incorporated by reference herein in its entirety; "Power Over Ethernet Lighting Fixture," U.S. patent application Ser. No. 14/725,687, filed May 29, 2015," which is incorporated by reference herein in its entirety; U.S. Provisional Application Ser. No. 62/292,528, titled Distributed Lighting Network, filed on Feb. 8, 2016 which is incorporated by reference herein in its entirety.

Each waveguide 10, 12 and its associated LED groups 32a-32d may be separately turned on, turned off and dimmed such that the light from each of the waveguides 10, 12 is independently controllable by the microprocessor 116. Allowing the waveguides 10, 12 to be independently controlled allows the light emission pattern to varied from all or substantially all axial light in a first direction A (e.g. uplight), all or substantially all axial light in a second direction B (e.g. down light), omnidirectional and variations between. Further, each LED group 32a-32d and waveguide section are independently controllable to allow controlling the radial or lateral light of each waveguide thereby allowing the light emission pattern to varied laterally (e.g. front to back, left to right). Also, the light properties such as color, color temperature, brightness, CRI, and color gamut of each of the LED groups are independently controllable by the microprocessor 116 and may also be adjusted by the user.

To provide automatic control of the luminaire an occupancy detector 117 is provided. In one embodiment the occupancy detector 117 comprises PIR detectors 118 for sensing motion in the vicinity of the luminaire's area of operation. In one embodiment four PIR sensors 118 are used in a cross-configuration to provide 360° of detection. The PIR sensors 118 may be used primarily to detect the presence or absence of a human being in the vicinity of the illumination area of the luminaire. While PIR sensors 118 may be used the sensors may comprise any sensor capable of detecting a stimulus such as thermal, microwave, ultrasonic detectors or the like or combinations of such detectors. While the sensors in a typical application may be used to detect the presence or absence of a human being, the sensors may be used to detect the presence or absence of other than a human being such as an animal, vehicle or the like in other applications. Such sensors are referred to herein as an occupancy detector. The occupancy detector 117 is operatively connected to the controller 116 that controls the LED drivers and control circuitry such that the LEDs may be controlled automatically in response to the inputs of the occupancy detector 117. In one embodiment the controller 116 may be programmed to turn off or dim the LEDs 32 if no motion is detected in the ambient environment of the luminaire after the elapsing of a predetermined time after the luminaire is turned on. This mode of operation may be considered a power saving mode where if no motion, or other stimuli, is detected after a predetermined period of time after the luminaire is turned on, the controller 116 turns off or dims the LEDs in order to conserve power. The predetermined period of time may be selected based on the user desired result and it may be programmed and saved in memory. Moreover, the desired power save mode may also be programmed and saved in memory 115. For example, after the elapsing of the predetermined period of time, the LEDs may be dimmed or turned off. In some embodiments, the power save mode may include multiple steps. For example, the LEDs may be dimmed after a first period of time and may be turned off after a second period of time. To the extent the occupancy detector detects motion or other stimuli, the LEDs are not dimmed or turned off. The occupancy detector 117 may also be used to turn on the luminaire when motion or other stimulus is detected. Moreover the waveguides 10, 12 may be independently controllable in response to the occupancy detector 117 such that controller 116 may independently adjust the light emissions of waveguides 10, 12. Various power save modes may be used based on the output of the occupancy detector.

An ambient light detector 124 may also provide additional automatic control of the luminaire. The ambient light detector 124 delivers an output signal to the controller 126 that controls the LED drivers 110 and control circuitry such that the LEDs may be controlled automatically in response to the inputs of the ambient light detector. The ambient light detector 124 may comprise a photodetector capable of detecting the ambient light in the luminaire's area of illumination. The ambient light detector 124 may comprise a variety of sensors capable of detecting ambient light levels such as photoemission, photoelectric, thermal photochemical and the like. Moreover, an array of sensors may be used and more than one type of sensor may be used in combination. The ambient light detector 124 may detect ambient lux and control the operation of the LEDs in response to the detected lux level. In one embodiment the luminaire may operate in two states where the microprocessor may be programmed to determine two Lux ranges based on input signals from the ambient light detector 124. When the ambient light level is in a first high lux range the luminaire (LEDs) may be turned off and when the ambient light level is in a second low lux range the luminaire (LEDs) may be turned on. For example, if the detected lux range is 0-499 lux the LEDs are turned on and if the detected lux range is ≥500 lux the LEDs are turned off. This mode of operation may also be considered a power saving mode where if the ambient light is above a predetermine threshold the LEDs are automatically turned off. The LEDs may be dimmed rather than being turned off completely based on the detected lux. Moreover, in this mode of operation the LEDs may be controlled in a stepped or continuous manner based on the detected lux. For example a plurality of lux ranges may be provided where for each lux level the output of the LEDs is changed. The control may be stepped where for detected lux levels that fall within a predetermined range of lux level the LEDs are operated at a predetermined lux output. For example, five lux ranges may be provided where the LEDs are progressively dimmed as the lux ranges increase. The control may be continuously variable where for any detected change in lux level the LEDs are operated at a corresponding predetermined lux output. To the extent the LEDs are dimmed the illumination pattern may be maintained (FIGS. 24A-25) while the LED output is dimmed.

Moreover, the waveguides 10, 12 may be independently controllable in response to the ambient light detector 124 such that upon at different lux levels or lux level ranges the controller may turn off, dim or brighten one or the other of the waveguides or both of the waveguides and the light levels of each of the waveguides may be adjusted independently.

In these and other embodiments the ambient light detector 124 and the occupation detector 117 may be operated simultaneously where the LEDs are turned off if the occupation detector 117 does not detect an occupant after a predetermined time or the LEDs are turned on when the occupation detector 117 detects a relevant occupant. When the LEDs are rendered operable by the occupation sensor detector 117 the light level is then controlled by the ambient light detector 124 as previously described. Under this embodiment the occupation detector 117 may enable operation of the LEDs but the LEDs may remain off if the ambient light detector 124 detects sufficient ambient lux.

Figure 21:
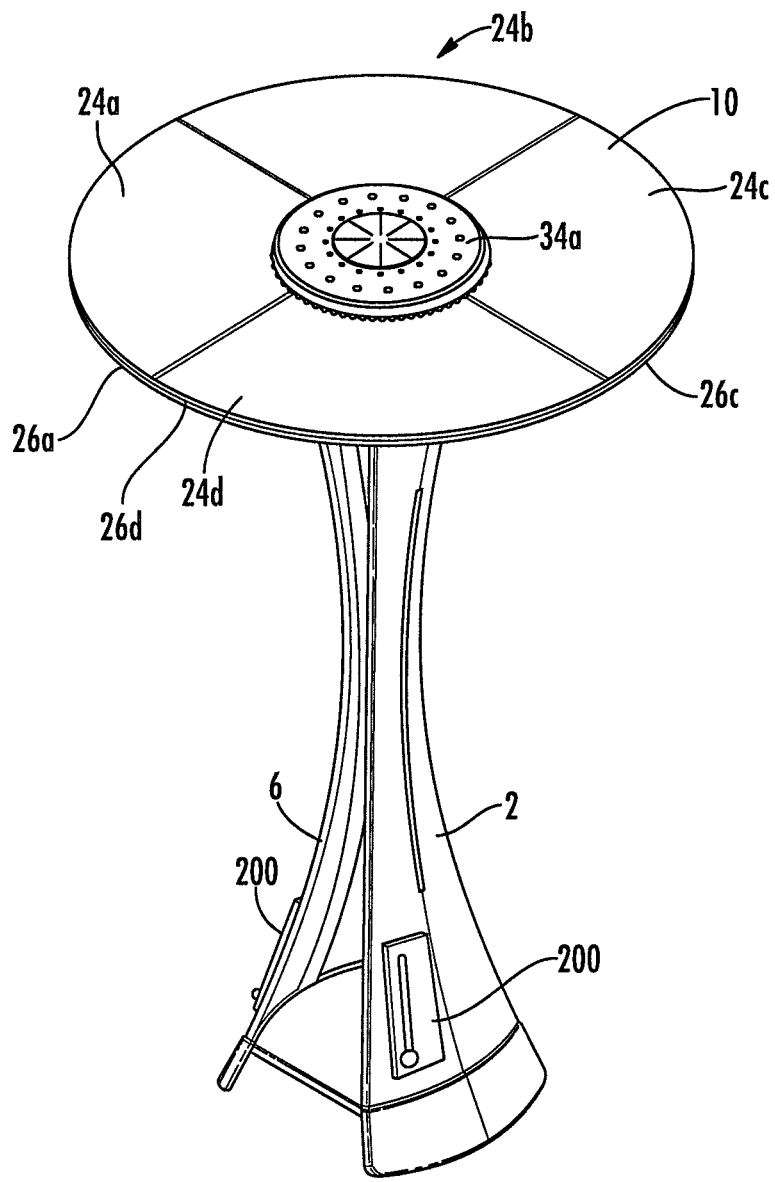
FIG. 21 is an isometric view of the luminaire of FIG. 19 including a second user control.

In addition to the automatic control of the luminaire provided as described above, the luminaire may also be controlled manually using a manual control device 122. The manual control device 122 may comprise a mechanical dimmer switch 200 comprising an on/off/dimmer switch. In one embodiment the mechanical switch 200 may have an on position, off position and adjustable dimming (FIG. 21). The adjustable dimming may use a slider or rotating knob to provide an input signal to the controller 116. The switch 200 transmits a control signal to the controller 116. In response to the control signal the controller 116 controls the drivers 110 to turn on, turn off or raise/lower the output of the LEDs and create a dimming effect. Because the LED groups are independently controllable a switch 200 may be provided for each independently controllable LED group. Alternatively one switch 200 may control more than one LED group. In all events at least one control switch is provided that allows a user to manually control each of the independently controllable LED groups.

Figure 5:
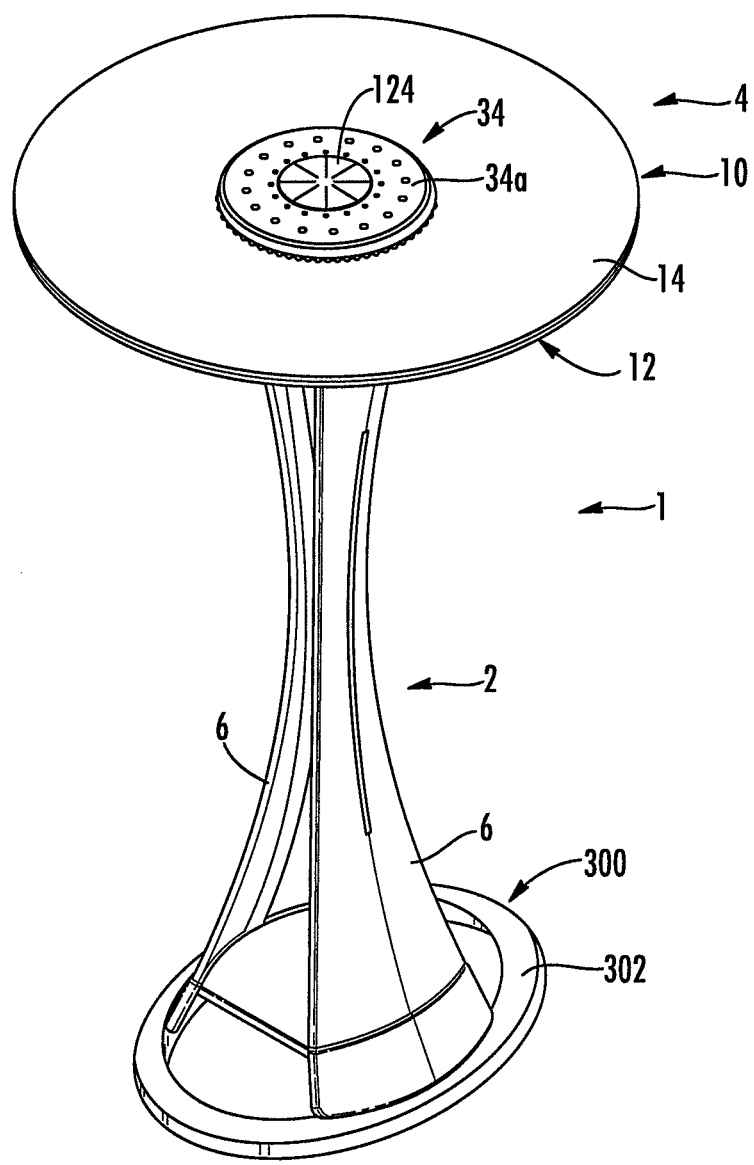
FIG. 5 is an isometric view of the luminaire of FIG. 1 including a first user control.
Figure 6:
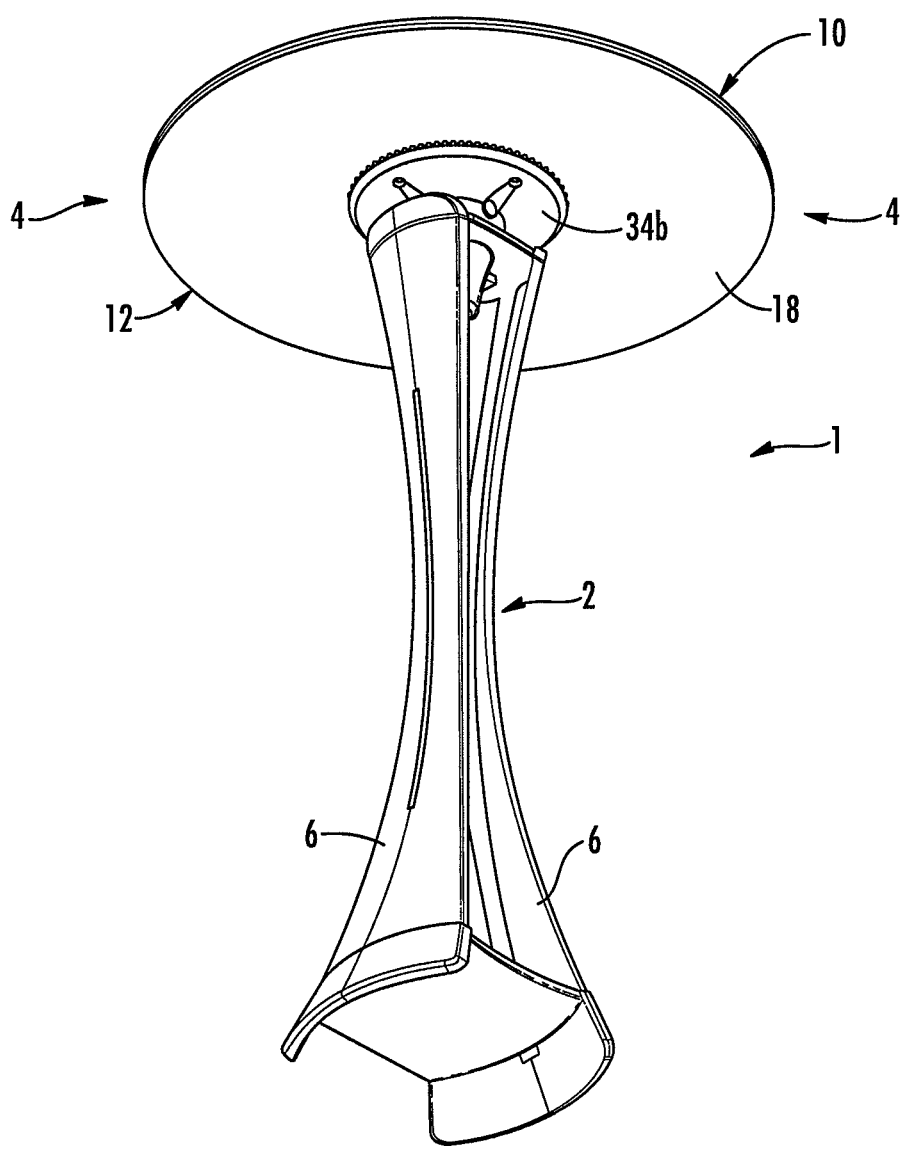
FIG. 6 is a bottom isometric view of the luminaire of FIG. 1.
Figure 7:
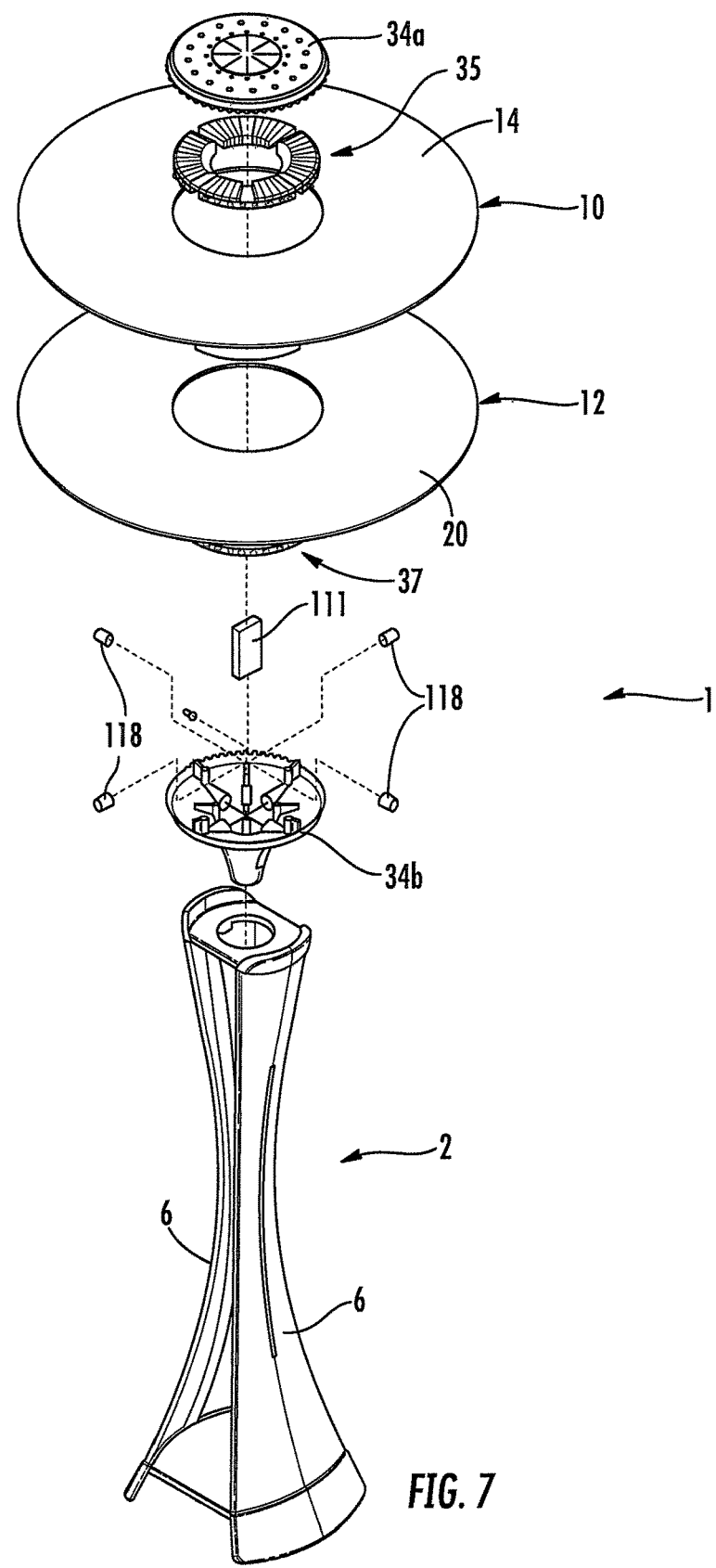
FIG. 7 is an exploded isometric view of the luminaire of FIG. 1.

In one embodiment the dimmer switch may comprise at least one capacitive touch switch 300 (FIG. 5). Different types of capacitance sensors may be used including surface capacitance and projected capacitance sensors. The projected capacitance sensors may comprise mutual capacitive sensors and self-capacitance sensors. Such sensors comprise a pad 302 that can detect the presence or absence of a touch as well as the position of the touch on the pad 302. The capacitive touch switch 300 may provide a signal to the controller 116 indicative of the presence of a touch as well as the position of the touch on the pad 302. In response to the input signal the controller 116 controls the operation of the LEDs. For example, a single tap on the sensor pad 302 may be programmed in the controller 116 to control the drivers 110 to turn the LEDs on and a triple tap on the sensor pad 302 may be programmed in the controller 116 to control the drivers 110 to turn the LEDs off. Once the LEDs are turned on a further single tap on the sensor pad 302 may increase the LED output in a step-wise fashion by increasing the output of the LEDs by a set amount for each single tap. Likewise, once the LEDs are turned on a further double tap on the sensor pad 302 may decrease the LED output in a step-wise fashion by decreasing the output of the LEDs by a set amount for each double tap. The system may also provide continuous dimming in addition to the step-wise dimming described above. For continuous dimming a single tap plus a drag of the touch on the sensor pad 302 may increase the LED output while a double tap plus a drag of the touch on the sensor pad 302 may decrease the LED output (dim). The slider may operate logarithmically from 1-100% output for the LEDs. In one embodiment as shown in FIG. 5, the capacitive switch 300 may be configured such that the touch pad 302 is a "wheel" or ring surrounding the luminaire such that the sensor pad 302 is accessible by the user from any side of the luminaire. The ring shaped sensor pad 302 may operate on a touch pattern such as described above to control on/off and dimming of the luminaire. Other patterns in addition to or different than those described above may be used for the control of the LEDs. Moreover, because the LED groups are independently controllable a switch 300 and/or switch pad 302 may be provided for each independently controllable LED group. Alternatively, one switch 200 may control more than one LED group and the touch sequence set forth above may be modified such that a single touch signals control of a first LED group, a double touch signals control of a second LED group, and so on. In all events at least one control switch is provided that allows a user to manually control each of the independently controllable LED groups.

Moreover, to further enhance the user control of the luminaire, Bluetooth low energy (LE) or other wireless functionality may be provided. The Bluetooth interface 120 communicates wirelessly with a remote control 400 such that a user may control the luminaire using a wireless remote control over a low power wireless interface. The remote controller may be provided with user inputs such as buttons to control on/off, up/down and may include preset lighting levels. The remote control 400 may include a dimming control as previously described. The remote control 400 may comprise any device capable of wireless data transfer and may include a mobile device such as a smart phone provided with an interface application for the luminaire and communication may be enabled over a network including a local network such as a Wi-fi network. The interface application on the remote control may include an authentication procedure to enable the remote control. In some embodiments the remote control may be connected to the luminaire by a wired connection and may be for example a wall switch.

In some embodiments, lighting profiles may be programmed into memory of the controller 116 such that a programmed lighting profile may be selected by the user at a touch of a button. For example, the lighting profiles may comprise a "reading" profile where most of the light is emitted as downlight, an "ambiance" profile where most of the light is emitted as uplight, a "wall wash" profile where most of the light is emitted toward a wall side of the luminaire or the like. Other pre-programmed profiles may be provided to provide a wide variety of pre-programmed light emission patterns. The programmed lighting profiles may be provided by the manufacturer as a factory setting and/or the profiles may be programmed by the user and stored in memory. The preprogrammed lighting profiles may be adjusted by the user during use of the luminaire using controls 122 and 400.

The luminaire provides an adjustable illuminance, luminance, and/or luminous flux distribution and/or light properties such as color, color temperature, brightness, CRI, and color gamut. For example, a luminaire fixture having a range of possible luminous flux distributions including a wall-wash setting (e.g., for highlighting artwork), a general or lambertian setting for general illuminance, and a collimated or spotlight setting for task lighting. The various settings (or combinations of settings) could be adjusted as previously described. This enables task specific lighting adjustments for a single luminaire, allowing a user to tailor illuminance to suit both the workspace and the task at hand. The embodiments disclosed herein may be used for general lighting, energy efficient lighting, task-specific lighting, emergency lighting, advertising, and other applications. For general lighting, at least some of the luminaires preferably require a total luminaire output of at least about 400 lumens or greater, and, more preferably, a total luminaire output of at least about 1000 lumens. As described herein a single luminaire configured as a table lamp for example, may be used in a wide variety of applications where the light output including light properties such as color, color temperature, brightness, CRI, and color gamut, and the light emission pattern may be selected and changed by the user such that the lamp may be configured by the end user for a specific application, use or environment. For example, the luminaire may selectively output light as cool white around 5000K, warm white around 2700K, dimmed light at around 1800K or the like such that the user may match the light output of the luminaire to the user's desired output. The luminaire may be simultaneously adjusted to adjust the light emission pattern of the luminaire to alter the light emitted axially and/or laterally. The simultaneous adjustment of the light properties such as color, color temperature, brightness, CRI, and color gamut as well as light emission pattern allows the user to customize the luminaire in a wide variety of ways.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A luminaire comprising:
a first waveguide having a first primary light emitting surface directed in a first direction and a first secondary light emitting surface directed in a second direction, and a second waveguide having a second primary light emitting surface directed in the second direction and a second secondary light emitting surface directed in the first direction, the first secondary light emitting surface and the second secondary light emitting surface being disposed adjacent one another such that the first primary light emitting surface and the second primary light emitting surface face generally away from one another, and the first primary light emitting surface comprising a first plurality of light extraction features that emit light in a first light emission pattern and the second primary light emitting surface comprising a second plurality of light extraction features that emit light in a second light emission pattern, the first light emission pattern being different than the second light emission pattern;

a first plurality of LEDs being optically coupled to the first waveguide such that activation of the first plurality of LEDs causes light to be emitted from the first primary light emitting surface and a second plurality of LEDs being optically coupled to the second waveguide such that activation of the second plurality of LEDs causes light to be emitted from the second primary light emitting surface, and a controller controlling operation of the first plurality of LEDs and the second plurality of LEDs such that the first plurality of LEDs and the second plurality of LEDs are independently operable.

2. The luminaire of claim 1 wherein the first plurality of LEDs comprises a first plurality of LED groups, wherein the controller controls operation of the first plurality of LED groups such that each one of the first plurality of LED groups is independently controllable.

3. The luminaire of claim 2 wherein the second plurality of LEDs comprises a second plurality of LED groups, wherein the controller controls operation of the second plurality of LED groups such that each one of the second plurality of LED groups is independently controllable.

4. The luminaire of claim 1 wherein the first waveguide comprises a first plurality of waveguide sections and the first plurality of LEDs comprises a first plurality of LED groups, one of the first plurality of LED groups being associated with one of the first plurality of waveguide sections, wherein the controller controls operation of the first plurality of LED groups such that each one of the first plurality of LED groups is independently controllable.

5. The luminaire of claim 4 wherein the second waveguide comprises a second plurality of waveguide sections and the second plurality of LEDs comprises a second plurality of LED groups, one of the second plurality of groups of LEDs being associated with one of the second plurality of waveguide sections, wherein the controller controls operation of the second plurality of LED groups such that each one of the second plurality of LED groups is independently controllable.

6. The luminaire of claim 5 wherein the first plurality of waveguide sections are coextensive with the second plurality of waveguide sections.

7. The luminaire of claim 1 wherein the controller controls the output of the first plurality of LEDs and the second plurality of LEDs based on an input from a detector.

8. The luminaire of claim 7 wherein the detector comprises an ambient light detector for detecting ambient light.

9. The luminaire of claim 8 wherein the controller alters the lux output level of at least one of the first plurality of LEDS and the second plurality of LEDs in response to input from the ambient light detector.

10. The luminaire of claim 7 wherein the detector comprises an occupancy detector for detecting a stimulus adjacent the luminaire.

11. The luminaire of claim 10 wherein the controller alters the lux output level of at least one of the first plurality of LEDs and the second plurality of LEDs in response to input from the occupancy detector.

12. The luminaire of claim 1 wherein the controller controls the output of the first plurality of LEDs and the second plurality of LEDs based on an input from a user control.

13. The luminaire of claim 12 wherein the user control comprises a capacitive sensor.

14. The luminaire of claim 13 wherein the capacitive sensor independently controls the on/off state and dimming levels of at least one of the first plurality of LEDs and the second plurality of LEDs.

15. The luminaire of claim 12 wherein the user control comprises a remote control that communicates with the controller over a wireless connection.

16. The luminaire of claim 5 wherein the first plurality of waveguide sections are coplanar and the second plurality of waveguide sections are coplanar.

17. The luminaire of claim 3 wherein independent energization of the first plurality of LED groups and the second plurality of LED groups generates a directional light pattern, the directional light pattern being variable along an axis of orientation of the first waveguide and the second waveguide and in a plane perpendicular to the axis of orientation.

18. The luminaire of claim 1 wherein the first waveguide and the second waveguide are supported on a support structure such that the primary light emitting surfaces are disposed horizontally.

19. A luminaire comprising: a plurality of first waveguide sections, each of the plurality of first waveguide sections having a first primary light emitting surface directed in a first direction and a first secondary light emitting surface directed in a second direction and a plurality of second waveguide sections, each of the plurality of second waveguide sections having a second primary light emitting surface directed in the second direction and a second secondary light emitting surface directed in the first direction, the first secondary light emitting surfaces and the second secondary light emitting surfaces being disposed adjacent one another such that light is primarily emitted from the luminaire through at least one of the first primary light emitting surface and second primary light emitting surface; at least one first LED being optically coupled to each of the first waveguide sections and at least one second LED being optically coupled to each of the second waveguide sections, and a controller controlling operation of the at least one first LED and the at least one second LED such that each of the at least one first LED and the at least one second LED are independently operable.

20. The luminaire of claim 19 wherein the first waveguide sections are in a one-to-one relationship with the second waveguide sections.

21. The luminaire of claim 19 comprising:
a support structure being supportable on a surface, the support structure supporting the plurality of first waveguide sections and the plurality of second waveguide sections;
each of the at least one first LED and the at least one second LED being operable to emit light from the waveguide having a light emission pattern and at least one light property, the controller controlling operation of the at least one first LED and the at least one second LED such that the light emission pattern and the at least one light property of the emitted light are controllable.

22. The luminaire of claim 21 wherein the at least one light property comprises at least one of color, color temperature, brightness, CRI, and color gamut.

23. The luminaire of claim 21 wherein the light emission pattern comprises light emitted at least in one of an axial direction and a lateral direction.

* * * * *